United States Patent [19]
Ishihara et al.

[11] Patent Number: 6,130,904
[45] Date of Patent: Oct. 10, 2000

[54] GAS SUPPLEMENTATION METHOD OF EXCIMER LASER APPARATUS

[75] Inventors: Takanobu Ishihara; Junichi Fujimoto; Hakaru Mizoguchi, all of Hiratsuka, Japan

[73] Assignee: Komatsu Ltd., Tokyo, Japan

[21] Appl. No.: 08/669,332

[22] PCT Filed: Dec. 22, 1994

[86] PCT No.: PCT/JP94/02187

§ 371 Date: Jun. 20, 1996

§ 102(e) Date: Jun. 20, 1996

[87] PCT Pub. No.: WO95/18477

PCT Pub. Date: Jun. 7, 1995

[30] Foreign Application Priority Data

Dec. 24, 1993 [JP] Japan ................................... 5/327832

[51] Int. Cl.⁷ ........................................................ H01S 3/22
[52] U.S. Cl. ............................... 372/59; 372/55; 372/57
[58] Field of Search ............................... 372/29, 31, 32, 372/33, 20, 57, 58, 55, 98, 59

[56] References Cited

U.S. PATENT DOCUMENTS

| | | | |
|---|---|---|---|
| 5,396,514 | 3/1995 | Voss | 372/57 |
| 5,440,578 | 8/1995 | Sandstrom | 372/59 |
| 5,450,436 | 9/1995 | Mizoguchi et al. | 372/59 |
| 5,463,650 | 10/1995 | Ito et al. | 372/57 |

FOREIGN PATENT DOCUMENTS

| | | | |
|---|---|---|---|
| 1-191490 | 8/1989 | Japan | 372/57 X |
| 3-135089 | 6/1991 | Japan | 372/57 X |
| 3-194991 | 8/1991 | Japan | 372/57 X |
| 4-26176 | 1/1992 | Japan | 372/57 X |
| 4-3987 | 1/1992 | Japan | 372/57 X |
| 4-120782 | 4/1992 | Japan | 372/57 X |

*Primary Examiner*—Brian Healy
*Attorney, Agent, or Firm*—Welsh & Katz, Ltd.

[57] ABSTRACT

In an excimer laser apparatus in which halogen gas, rare gas and buffer gas are fed into the laser chamber, before laser oscillation, the oscillation stop time is calculated, and, if the calculated oscillation stop time exceeds a prescribed time, the calculated oscillation stop time is used to calculate a feeding amount of mixed gas comprising rare gas or buffer gas, and the mixed gas is fed, prior to laser oscillation, in the calculated feeding amount; stable laser output is thereby obtained from the initial period of laser oscillation.

17 Claims, 30 Drawing Sheets

GAS SUPPLEMENTATION METHOD OF EXCIMER LASER APPARATUS

TECHNICAL FIELD

The present invention relates to an excimer laser apparatus employed for example in light sources for reduced-size projection exposure, microprocessing of materials, or surface improvement of materials; in particular, it relates to improvements for enabling the laser to oscillate in stable fashion over a long period.

BACKGROUND ART

Conventionally, when an excimer laser apparatus employing halogen gas is operated, the halogen gas is consumed, during the process of operation, by evaporation of the electrode materials and chemical reaction with the constituent material of the laser chamber. Conventionally therefore, control was performed as follows in order to compensate for the lowering of laser output produced by consumption of halogen gas.

Specifically, the laser output is obtained by passing through a discharge space electrical energy for laser excitation that was accumulated on a capacitor, the discharge being effected in laser medium gas; if the charging voltage of this capacitor is raised, laser output is increased. Conventionally therefore laser output was stabilized by detecting the laser output and controlling the value of the charging voltage in accordance with the results of this detection. Such control is called "power lock control" and this charging voltage will hereinbelow be called the "power lock voltage".

However, even with such control, if operation is continued for a long time, the efficiency of oscillation is lowered by consumption of halogen gas, with the result that the prescribed output cannot be maintained unless the charging voltage (power lock voltage) is progressively raised.

Conventionally therefore arrangements were made to attempt to cope with this consumption of halogen gas by arranging for supplementation with a fixed quantity of halogen gas when the charging voltage increased above some prescribed voltage.

Such a method of halogen gas supplementation according to the prior art will be described with reference to FIG. 29 to FIG. 31.

In more detail, FIG. 29 shows structural parts pertaining to gas supplementation of a typical fluorine-based excimer laser apparatus; in this case, there are provided, as a gas feed cylinder, a cylinder 41 that is charged with a halogen gas ($F_2$, HCl etc) diluted with a buffer gas (Ne or He etc), a cylinder 42 charged with a diluent gas such as Kr, and a cylinder 43 charged with a buffer gas such as Ne or He; when effecting gas feed on start-up, gas feed to laser chamber 47 is effected by open/shut control of on/off valves 44, 45, 46, and, when supplementing the halogen gas after operation, gas feed is effected through on/off valves 48, 49 and "subtank" 50.

In more detail, when introducing new gas into laser chamber 47 before start-up, first of all, the old gas in laser chamber 47 was discharged by means of on/off valve 51 and vacuum pump 52.

Next, Kr gas is introduced into laser chamber 47 to a pressure of 40 torr from cylinder 42 through on/off valve 45; next, $F_2$ gas diluted by Ne gas is introduced to a pressure of 80 torr from cylinder 41 through on/off valve 44; finally Ne gas is introduced from cylinder 43 through on/off valve 46 to make the overall pressure in laser chamber 47 2500 torr.

By such gas feed control, the gas composition within laser chamber 47 in this apparatus becomes $F_2$:Kr:Ne=4:40:2456 (torr), i.e. $F_2$:Kr:Ne=0.16:1.60:98.24 (%) in terms of concentration ratios.

Thus, when laser chamber 47 is charged with new gas, gas supplementation control is performed by the procedure shown in the flow chart of FIG. 30 during subsequent laser operation.

First of all, before operating the excimer laser apparatus, the target laser output Ec, optimum control charging voltage range Vm (Vmin to Vmax), the increase/decrease charging voltage $\Delta V$ when control is exercised once, and the one-time supplementation gas amount $\Delta G$ are set beforehand (step 500).

When operation is then started, controller 55 gets the laser output E detected by laser output monitor 53 and the charging voltage V detected by charging voltage detector 54 (step 510). Controller 55 compares detected laser output E with the target laser output Ec (step 520); if E<Ec, it raises the detected charging voltage V by the minute voltage $\Delta V$ and makes this the instruction charging voltage Va (step 530); if E=Ec, it leaves the detected charging voltage V unaltered and takes this as instruction charging voltage Va (step 540); if E>Ec, it lowers the detected charging voltage V by the minute voltage $\Delta V$ and takes this as the instruction charging voltage Va (step 550).

Furthermore, controller 55 compares instruction charging voltage Va with the maximum value Vmax of the maximum control charging voltage range Vm (step 560); if Va<Vmax, it returns again to step 510, to perform control of instruction voltage Va. However, if Va>Vmax, supplementation of $F_2$ gas containing Ne gas from cylinder 41 in a prescribed amount $\Delta G$ is effected into laser chamber 47 (step 570), and some of the gas is discharged (step 580) so as to maintain the prescribed overall pressure of the gas in laser chamber 47.

FIGS. 31($a$) to 31($d$) show respectively time charts in respect of laser output E, instruction charging voltage Va, halogen gas ($F_2$) concentration, and diluent gas (Kr) concentration resulting from the above control; the laser shot number is taken along the time axis. In FIG. 31($b$), the time points t1 to t6 at which the charging voltage instruction Va to the capacitor suddenly drops correspond to the times when supplementation of halogen gas is effected.

However, with the prior art technique, gas cylinder 41 that is used for halogen gas supplementation does not contain a diluent gas constituent. Furthermore, with this prior art technique, every time gas supplementation occurs, control is exercised such as to maintain the overall pressure constant (step 580 of FIG. 30) by discharging some of the gas in laser chamber 47, so, every time gas supplementation is performed, the amount of diluent gas (Kr) is gradually decreased as shown in FIG. 31($d$): a simple calculation shows that 20% of the Kr gas is eliminated by ten gas supplementations. In other words, this means that, as shown in FIG. 31($c$), as gas supplementation of the halogen gas ($F_2$) goes on, there will gradually be over-supplementation. Also, even if the one-time supplementation amount $\Delta G$ is set sufficiently small so that over-supplementation does not occur, as shown in FIG. 31($c$), the supplementation intervals then gradually decrease with the result that, in the end, the gas balance is destroyed. That is, with the prior art technique described above, every time supplementation of halogen gas is effected, the optimum compositional balance of the mixed gas in laser chamber 47 is lost, with the result that it becomes impossible to maintain a fixed laser output, no matter how the charging voltage to the capacitor is controlled.

Furthermore, with the prior art, there was the problem that, since halogen gas was supplemented in fixed amount every time in response to a comparison of the charging voltage but irrespective of the optimum compositional balance of the gas, it was difficult to maintain the optimum compositional balance, and the gas balance could easily be lost by external disturbances.

Furthermore, with the prior art, regarding gas exchange, this was always performed with the same gas composition, considered as optimum. However, with use of the laser for a long period of time, impurities and/or dust accumulate in the chamber so that there is a progressive fall-off in laser output. For this reason, even though gas exchange is performed, the charging voltage needed to obtain a prescribed laser output gradually becomes higher.

Furthermore, although, in some examples of the prior art, control of feeding of halogen gas is performed, this merely consists of the type of control in which a fixed quantity of halogen gas is intermittently fed, so there was the problem that the laser output was lacking in stability.

Also, with the prior art, there was no automatic notification of the time for changing the gas or the time when maintenance was due, so the operator had to make a decision about these from the dirtiness of the window or condition of deterioration of the gas, or the life of the laser chamber etc: this was difficult for an operator of limited experience.

Moreover, when laser oscillation is stopped, the gas in the laser chamber continues natural deterioration with lapsed time. However, in the prior art, no measures were taken regarding laser stoppage, so when laser oscillation was commenced, there was the problem that laser output was unstable. This was particularly marked if the laser was stopped for a long period.

With the foregoing in view, it is an object of the present invention to provide a method of gas supplementation for an excimer laser apparatus whereby loss of the optimum composition balance of the gas becomes unlikely even when gas supplementation is repeated many times; wherein the time point of gas supplementation and the amount of gas supplementation can be determined accurately; wherein stable laser output can be obtained even when the laser is stopped for a long a period; and wherein the operator is notified automatically and appropriately of the time for gas exchange and the time for maintenance.

DISCLOSURE OF THE INVENTION

In an excimer laser apparatus in which laser oscillation is performed with feeding of halogen gas, rare gas and buffer gas into a laser chamber, the first invention is characterized in that, for laser oscillation, an oscillation stop time is calculated, and, if this calculated oscillation stop time exceeds a prescribed time, this calculated oscillation stop time is used to calculate a feeding amount of mixed gas comprising rare gas and buffer gas, and the mixed gas in the amount of this calculated feeding amount is fed prior to laser oscillation (power correction subroutine 1).

With the first invention, the rare gas and buffer gas are supplemented in an amount corresponding to the oscillation stop time, so laser oscillation is performed after returning the output that had shown a natural deterioration during laser stoppage, to the correct original condition.

Since, with the first invention, supplementation of rare gas and buffer gas is thus performed in an amount corresponding to the oscillation stop time prior to laser oscillation, laser oscillation can be performed after restoring the output drop of the laser due to natural deterioration during laser stoppage to its original correct condition; a stable laser output can thus be obtained from the initial period of laser oscillation.

In the second invention, the halogen gas partial pressure within the laser chamber is detected, and the supplementation amount of halogen gas is determined in accordance with this detected partial pressure value.

With the second invention, the supplementation amount of halogen gas is determined in response to the halogen gas partial pressure, which is the parameter that has the most direct relationship with the amount of diminution of halogen gas.

Thus, with the second invention, the partial pressure of the halogen gas within the laser chamber is detected, and the amount of supplementation of halogen gas is determined in response to the detected partial pressure value, so halogen gas can be supplied accurately in the amount of the diminution of halogen gas.

With the third invention, feeding of mixed gas comprising rare gas and buffer gas is not performed prior to laser oscillation, but if, after laser oscillation, the laser output during this laser oscillation departs from the rated laser output, the charging voltage is detected and an amount of mixed gas comprising rare gas and buffer gas is fed that is equal to the amount calculated in accordance with the charging voltage that was thus detected (power correction subroutine 3).

With the third invention, feeding of rare gas and buffer gas is not performed prior to laser oscillation. However, immediately after laser oscillation, if the laser output during oscillation exceeds the rated laser output, rare gas and buffer gas are fed in amount calculated in accordance with the detected charging voltage. That is, if the laser output exceeds the rated laser output, normally the charging voltage will have a fairly high value; in this case, the charging voltage value is immediately lowered by feeding at once a large quantity of rare gas and buffer gas corresponding to this large value of charging voltage.

Thus, with the third invention, the charging voltage is controlled such that a desired laser output is obtained immediately after laser oscillation, and the charging voltage when the desired laser output has been obtained is detected, rare gas or buffer gas being fed in an amount calculated in accordance with the detected charging voltage; consequently, even if the charging voltage is in a condition higher than initially, it is possible to feed at once a large quantity of rare gas or buffer gas corresponding to this large charging voltage value, with the result that the charging voltage value can be brought down at a stroke, in comparison with the conventional system of feeding of fixed quantities of gas.

With the fourth invention, if a gas exchange request signal is output prior to laser oscillation, the initial power lock voltage in the presently charged gas is detected and this detected value is compared with a prescribed threshold value; if the detected value is smaller than the threshold value, gas exchange is effected with gas of the same composition as on the previous occasion; if the detected value is larger than the threshold value, the feeding amount of mixed gas comprising rare gas and buffer gas is altered in accordance with the deviation between this detected value and the threshold value, and gas exchange is performed with a gas composition based on this altered feeding amount (power correction subroutine 1, power correction subroutine 2).

With the fourth invention, in gas exchange, whether or not to change the composition of the gas is determined in accordance with the power lock voltage and, if the gas composition is to be changed, the feeding amount of rare gas and buffer gas is determined in accordance with the power lock voltage.

Thus, with the fourth invention, if a gas exchange request signal is output prior to laser oscillation, the gas composition relating to the rare gas and buffer gas is altered in accordance with the initial power lock voltage in the presently charged gas, so if for example the initial power lock voltage is high, gas exchange is effected with a gas composition in which rare gas and buffer gas have been added to the gas composition used on the previous occasion, so the prescribed laser output can be obtained from the comparatively low charging voltage on commencement of laser oscillation.

With the fifth invention, if the charging voltage after laser oscillation exceeds the prescribed threshold value, a prescribed amount of mixed gas is fed at the time point where the time for which oscillation has occurred with the charging voltage above threshold value has exceeded the prescribed time interval, after feeding of mixed rare gas and buffer gas on the previous occasion (Kr/Ne mixed gas feeding subroutine 1).

With the present invention, if the charging voltage exceeds the prescribed threshold value, feeding of mixed gas is performed in prescribed amount corresponding to the condition in which the charging voltage has come to be above the threshold value during the aforesaid time interval; accurate and precise laser output fixed control can thereby be achieved by feeding of rare gas and buffer gas, even when control is performed by supplying a fixed quantity of gas.

With the sixth invention, if, prior to laser oscillation, a gas exchange request signal is output, a window exchange signal or maintenance request signal is output in response to the presently charged gas oscillation shot number or presently charged gas charging time or gas pressure within the laser chamber or number of gas charges after window exchange of the laser chamber (gas exchange request signal output subroutine).

With the sixth invention, a window exchange signal or maintenance request signal is automatically output in response to oscillation shot number of the presently charged gas or charging time of the presently charged gas or gas pressure within the laser chamber or number of times of gas charging after window exchange of the laser chamber.

Thus, with the sixth invention, since a window exchange signal or maintenance request signal is automatically output in response to oscillation shot number of the presently charged gas or charging time of the presently charged gas or gas pressure within the laser chamber or number of times of gas charging after exchange of the window of the laser chamber, the correct time for maintenance or window exchange can be ascertained by the operator.

The seventh invention is characterized in that feeding of mixed gas comprising rare gas and buffer gas is performed by a mass flow controller and charging voltage is detected after laser oscillation, the feeding flow rate of the mixed gas being altered in accordance with the difference between this detected charging voltage and the upper limit value of the charging voltage (Kr/Ne mixed gas feeding subroutine 3).

Thus, with the seventh invention, precise feeding can be achieved even in minute amounts by the mass flow rate controller and flow rate control of the mass flow controller is performed in response to the difference between the charging voltage and the upper limit value of this charging voltage; precise and accurate laser output fixed control can thereby be achieved by feeding of rare gas and buffer gas.

Thus, with the seventh invention, feeding of mixed gas comprising rare gas and buffer gas is performed using a mass flow controller and the charging voltage for power lock is detected after laser oscillation, the feeding flow rate of the mixed gas being altered in response to the difference between this detected charging voltage and the charging voltage threshold value; accurate and precise laser output constant control can thereby be achieved by means of rare gas and buffer gas feeding.

With the eighth invention, the laser shot number since feeding of the mixed gas comprising rare gas and buffer gas on the previous occasion is calculated, and if this shot number exceeds the prescribed threshold value, mixed gas is fed (Kr/Ne mixed gas feeding subroutine 2).

With the eighth invention, feeding of rare gas is performed based on the laser shot number, which is in direct relationship with the laser oscillation rate.

Thus, with the eighth invention, the laser shot number occurring after the feeding of the mixed gas comprising rare gas and buffer gas on the previous occasion is calculated, and mixed gas feeding is performed if this shot number exceeds a prescribed threshold value; feeding of rare gas is therefore performed based on the laser shot number, which has a direct relationship with the laser oscillation rate, so accurate and precise laser output control can be achieved.

With the ninth invention, the oscillation spectral line width is detected, and the amount of halogen gas to be fed is determined in accordance with the difference between this detected line width value and a target spectral line width (F2 feeding subroutine 3).

With the present invention, the halogen gas feeding amount is determined in accordance with the spectral line width, which is in proportional relationship with the number of molecules of halogen gas. That is, when control is performed to make the spectral line width the prescribed target value, as halogen gas is consumed, the spectral line width becomes narrower, so the feed amount of halogen gas is increased in this case such as to make the spectral line width broader. And if the spectral line width has become broader, the feed amount of halogen gas is reduced so as to make the spectral line width narrower.

Thus, with the ninth invention, the oscillation spectral line width, which is in proportional relationship with the halogen gas partial pressure is detected, and the feeding of amount of halogen gas is determined in accordance with the difference of this detected line width value and the target spectral line width; an accurate quantity of halogen gas can therefore be supplied maintaining the target spectral line width.

BEST MODE FOR CARRYING OUT THE INVENTION

Figure 1:
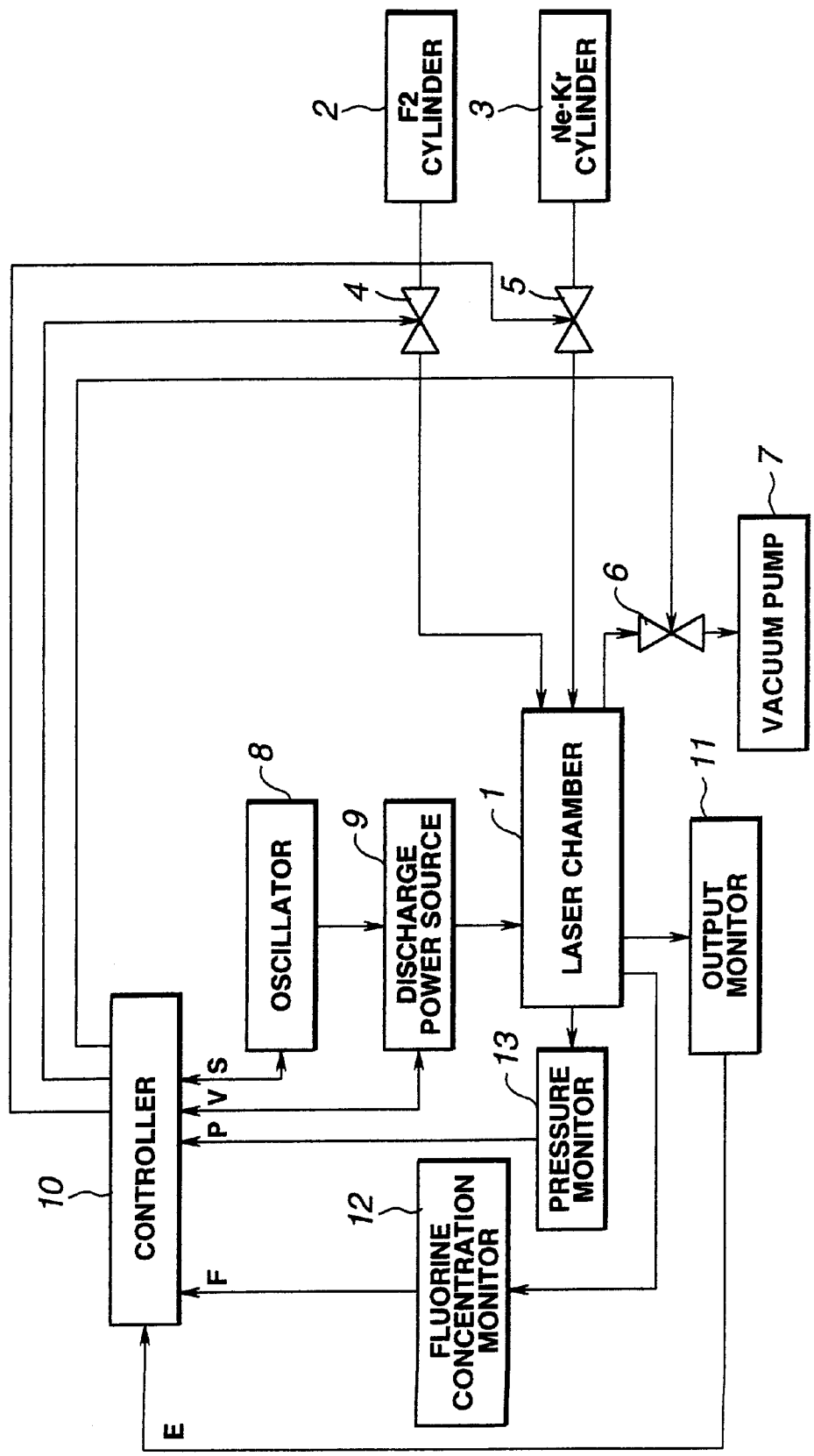
FIG. 1 is a block diagram employed in the first, second and third embodiments of the present invention.

The present invention is described hereinbelow in detail with reference to embodiments illustrated in the drawings.

When operation of an excimer laser apparatus is continued, with such continued operation, the laser output falls off, due to consumption of the halogen gas and generation of impurities. The laser output is obtained by applying electrical energy stored on a capacitor for excitation of laser gas to a discharge space, thereby discharging it through the laser medium gas.

The following three techniques are available as general means for compensating for the drop in laser output:
(1) Raising the charging voltage V to the capacitor;
(2) Feeding Kr/Ne mixed gas to raise the total pressure;
(3) Compensating for the decrease in F2 gas by feeding of F2/Ne mixed gas.

First embodiment

A first embodiment of the present invention is described below with reference to FIG. 1 to FIG. 7.

FIG. 1 shows the layout of a gas feeding system for a KrF excimer laser; feeding of gas into laser chamber 1 is achieved by means of a construction comprising: a cylinder 2 charged with halogen gas (in this case fluorine) F2 diluted with Ne as buffer gas, a cylinder 3 charged with buffer gas Ne and diluent gas (in this case krypton) Kr in an arbitrary mixing ratio, and gas feeding on/off valves 4, 5 arranged on the supply path of the gases from the cylinders to laser chamber 1.

Discharge of gas from laser chamber 1 is effected by means of a construction comprising a gas discharge on/off valve 6, and a vacuum cylinder 7.

It will be assumed that cylinder 2 contains F2 and Ne in concentration ratio F2:Ne=5:95 (%), while cylinder 3 contains Kr and Ne in concentration ratio Kr:Ne=1.5:98.5 (%).

Oscillator 8 is an oscillator for internal triggering for producing pulsed oscillation; an oscillation instruction signal constituted by a pulse signal is output from this oscillator 8 to discharge power source 9 and a signal S synchronized with this oscillation instruction pulse signal is output to a controller 10.

Discharge power source 9 serves to effect discharge between two electrodes within the laser chamber 1 at a frequency corresponding to the oscillation instruction pulse signal that is output from oscillator 8, and is temporarily charged up by a charging circuit with a voltage corresponding to the instruction charging voltage V that is input from controller 10; it then performs discharge by operation of a switch element such as a thyratron. When the laser gas is excited by performing discharge within laser chamber 1, laser oscillation is produced by an optical oscillator, not shown, resulting in output of laser light. It should be noted that the discharge is implemented as a pulsed oscillation.

Output monitor 11 detects the energy E (hereinbelow termed the laser output) of laser light that is output, and also detects the fact that laser light is being output; its detected value E is input to controller 10.

Fluorine concentration monitor 12 detects the fluorine concentration F in laser chamber 1 and inputs the detected value F to controller 10.

Pressure monitor 13 detects the total pressure P of the gas in laser chamber 1; detected value P is input to controller 10.

Controller 10 uses the output E of output monitor 11 to calculate an instruction charging voltage V, in a way to be described; this is output to discharge power source 9, thereby controlling the discharge voltage. Also, controller 10 exercises control by controlling opening and closing of valves 4 and 5 during gas exchange or gas feeding during or prior to laser operation, such that the amount of gas fed into laser chamber 1 is a prescribed amount. Also, controller 10 calculates the partial pressure Fp of the fluorine from the fluorine concentration F and total gas pressure P. Furthermore, controller 10 monitors the power lock charging voltage (charging voltage when the laser output E has attained its prescribed value) Vp etc and is equipped with a memory table that stores these monitored values.

The operation of a first embodiment, performed chiefly by controller 10, will be described below with reference to the flow charts of FIG. 2 to FIG. 7.

First of all, the various parameter values listed below are set to respective prescribed values (step 100a).

Tt: lower limit time for output correction . . . lower limit time for output correction on stoppage of oscillation If the period of oscillation stoppage is long, the laser output is lowered, so if the period of oscillation stoppage exceeds time Tt, the drop in laser output is compensated by feeding of Kr/Ne mixed gas.

Pa: total pressure on termination of feeding . . . upper limit of total pressure on gas feeding When the total pressure exceeds Pa, feeding of Kr/Ne mixed gas is stopped.

Vc: Kr/Ne mixed gas feeding charging voltage . . . threshold value of charging voltage at which feeding of Kr/Ne mixed gas is to be performed.

Tg: Kr/Ne mixed gas feeding interval time

If, after the previous occasion of feeding of Kr/Ne mixed gas, the time at which laser oscillation was achieved after the charging voltage had reached Vc exceeds Tg, a prescribed amount of Kr/Ne mixed gas is fed.

Fc: target partial pressure of fluorine $\Delta$Fc: allowed width of target partial pressure of fluorine ($\pm\Delta$Fc)

Ec: rated laser output $\Delta$Vc: minimum amount of increase/decrease of charging voltage Va: upper limit of charging voltage Sc: target oscillation shot number for one feed gas Dc: target feeding time for one feed gas Gn: Kr/Ne mixed gas feeding amount Also, the variables listed below are not initially set in step 100a, but are employed in the processing to be described below, so they are defined below.

$\Delta$Vm: allowed width of charging voltage ($\pm\Delta$Vm)

St: number of shots of interval of feeding of Kr/Ne mixed gas

Sn: number of shots of interval of F2 feeding $\lambda$c: target spectral line width $\Delta\lambda$c: allowed width of target spectral line width ($\pm\Delta\lambda$c)

Dt: feeding time of presently fed gas

St: number of oscillation shots of presently fed gas

Vp: power lock charging voltage

Sn: number of shots after feeding of Kr/Ne mixed gas on previous occasion

Fp: partial pressure of F2

$\Delta$Fp: Fp−Fc

Pb: threshold value for total gas pressure for maintenance request.

Figure 3:
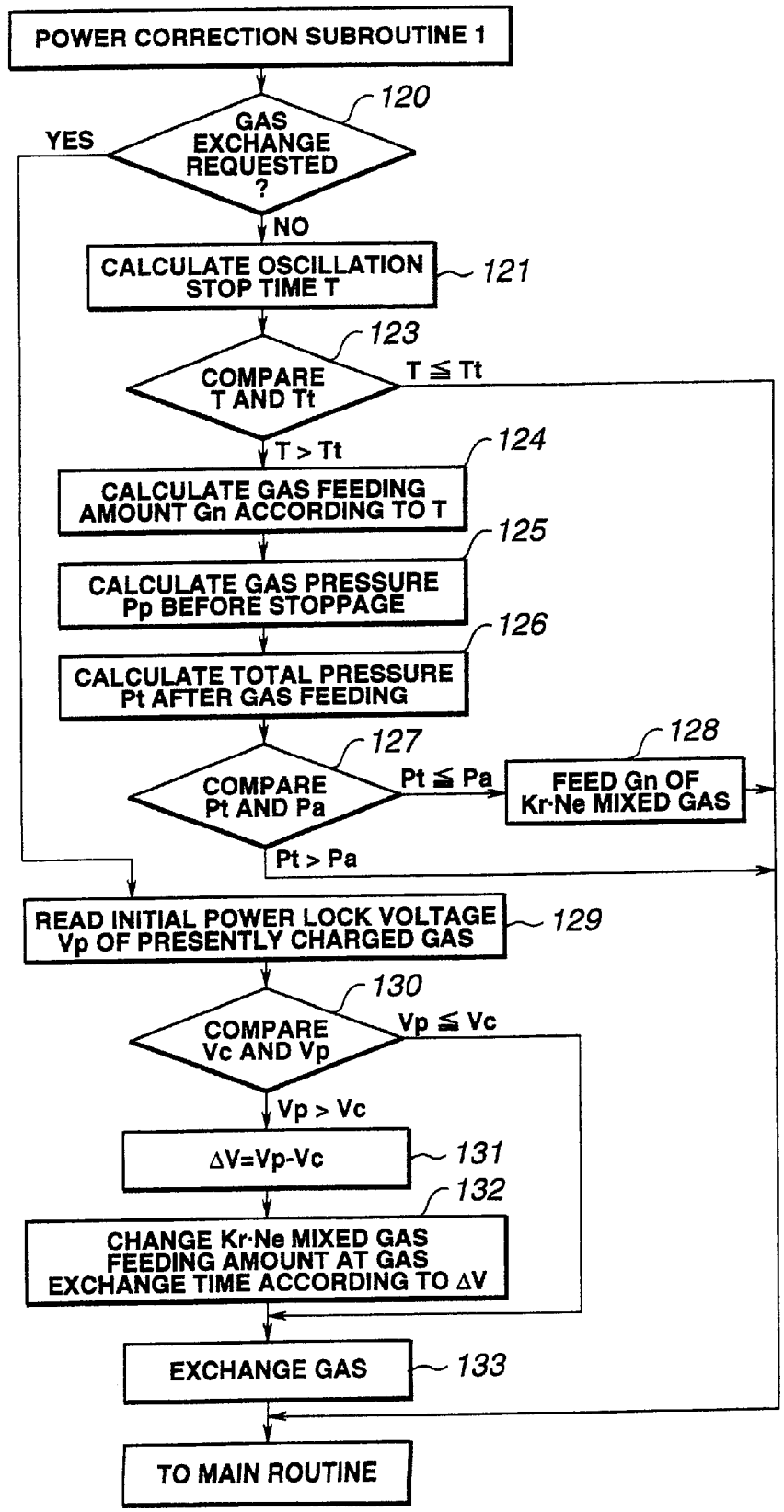
FIG. 3 is a flow chart showing power correction subroutine 1.

When setting of the above parameters has been completed, the procedure shifts to the power correction subroutine 1 shown in FIG. 3 (step 101a).

This power correction subroutine 1 is a routine to compensate the laser output drop produced by gas exchange and a prolonged period of cessation.

First of all, controller 10 checks for the presence of a gas exchange request signal (step 120); if there is an exchange request, it reads from the memory table the initial power lock voltage Vp of the gas presently being fed (step 129) and compares this power lock charging voltage Vp with Kr/Ne mixed gas feeding charging voltage Vc (step 130). If, as a result of this comparison, it finds that Vp$\leq$Vc, it performs gas exchange with the same gas composition as the gas exchange on the preceding occasion (step 133). However, if Vp>Vc, it performs gas exchange with a gas composition wherein the pressure of feeding of the Kr/Ne mixed gas is altered in accordance with $\Delta$V (=Vp−Vc) (steps 132, 133). That is, if the value of $\Delta$V gets large, gas exchange is effected with a feeding pressure of Kr/Ne mixed gas that is proportionally larger.

Specifically by the above control, it is arranged that, if Vp during laser oscillation on the previous occasion was higher than Vc, gas exchange is performed such that Kr/Ne mixed gas is added in a quantity corresponding to $\Delta$V; the prescribed laser output can therefore be obtained by a low power lock charging voltage in laser oscillation after gas exchange.

Also, if the decision made in step 120 does not request gas exchange, controller 10 first of all calculates oscillation stop time T. It then compares this oscillation stop time T with the output correction lower limit time Tt (step 123); if T$\leq$Tt, the procedure returns to the original main routine; if T>Tt, an amount Gn of mixed Kr/Ne gas is calculated corresponding to the oscillation stop time T (step 124).

Next, controller 10 reads total pressure Pp prior to oscillation stoppage from the memory table (step 125) and calculates the total pressure Pt after feeding from this calculated feeding amount of mixed Kr/Ne gas Gn and the total pressure Pp prior to oscillation stoppage (step 126) and compares this calculated value Pt with the total pressure Pa after completion of feeding. Then, if the calculated value Pt exceeds the total pressure Pa on completion of feeding, the procedure returns to the main routine without any action being taken; if the calculated value Pt does not exceed the total pressure Pa on completion of feeding, an amount Gn of mixed Kr/Ne gas is fed (steps 127, 128).

That is, with the above control, an amount of Kr/Ne mixed gas corresponding to the oscillation stop time is fed prior to laser oscillation, so the drop in laser output due to natural deterioration of the gas during oscillation stoppage can be forestalled.

It may be noted that, in the gas exchange performed in step 133 and the feeding of mixed Kr/Ne gas performed in step 128, feeding of the desired quantity of gas is performed by controlling the time for which valve 4 or 5 is opened. In this gas feeding, the total pressure P in the laser chamber 1 is monitored by pressure monitor 13, and this detected value P is used to control opening/closing of valve 4 or 5 such that the pressure within laser chamber 1 becomes a prescribed value. Gas discharge during gas exchange is achieved by starting vacuum pump 7 and opening valve 6.

Figure 2:
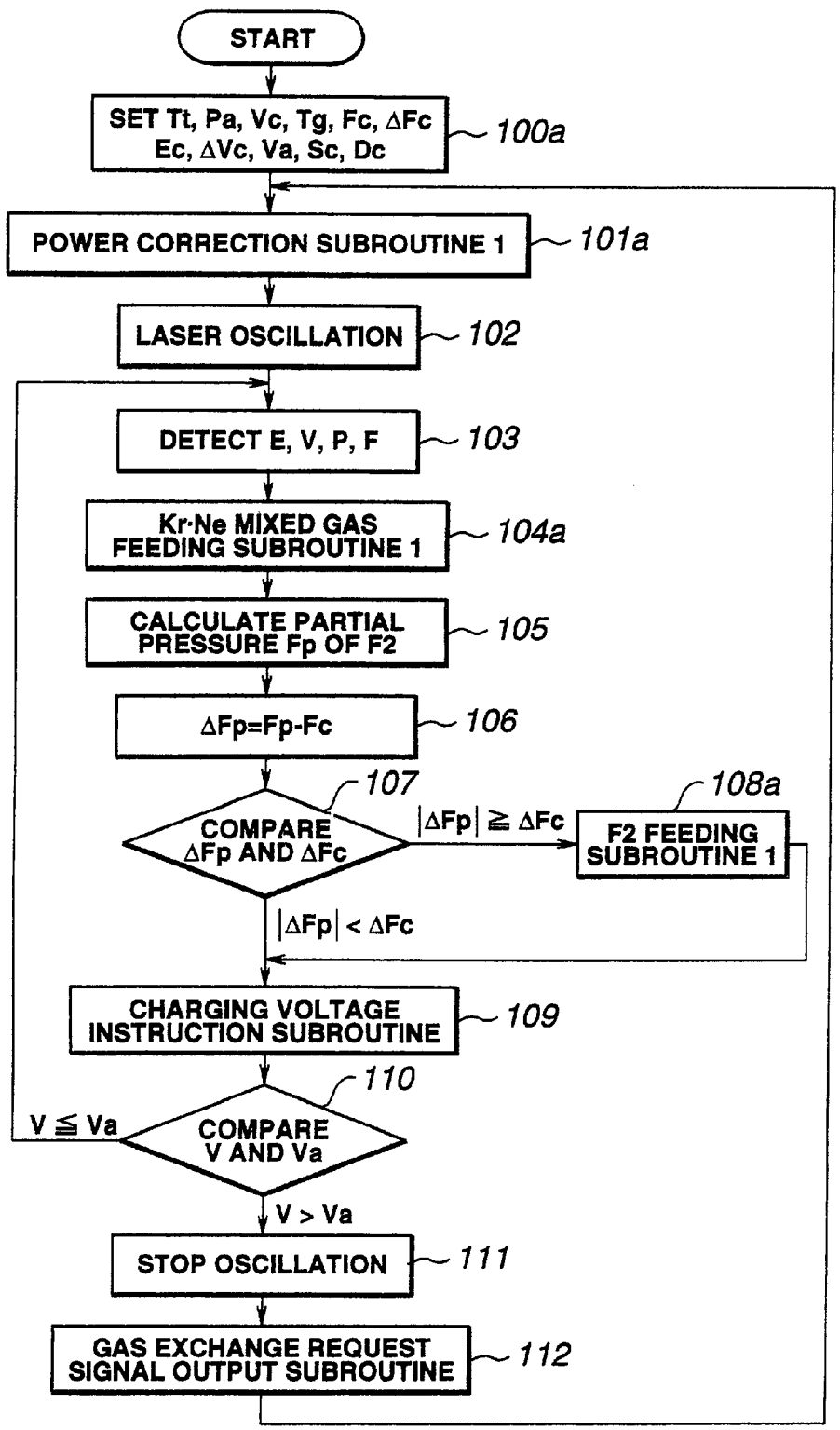
FIG. 2 is a main routine flow chart illustrating the overall operation of the first embodiment.

When power correction subroutine 1 has been completed as described above, laser oscillation is commenced by the main routine (FIG. 2 step 102). During this laser oscillation, laser output E, charging voltage V, total pressure P, and fluorine concentration F respectively detected by output monitor 11, charging power source 9, pressure monitor 13 and fluorine concentration monitor 12 are input to controller 10 (step 103).

Figure 4:
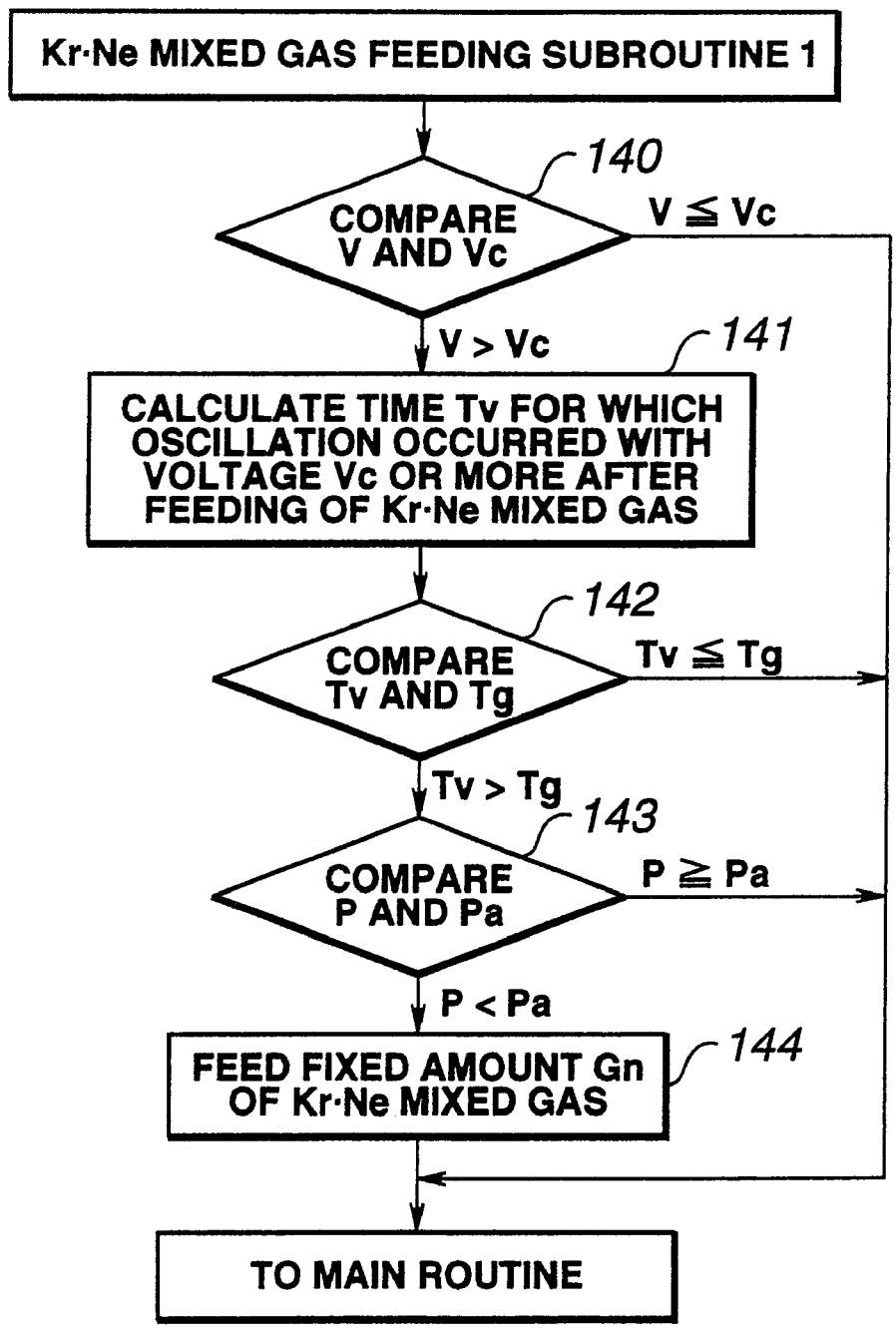
FIG. 4 is a flow chart showing Kr/Ne mixed gas feeding subroutine 1.

Next, the procedure shifts to the Kr/Ne mixed gas feeding subroutine 1 shown in FIG. 4 (step 104a). This Kr/Ne mixed gas feeding subroutine 1 is a routine for compensating the output that falls with lapsed time of laser oscillation.

First of all, the charging voltage V is compared with the Kr/Ne mixed gas feeding charging voltage Vc (step 140); if V>Vc, the time Tv is calculated at which laser oscillation occurred with a charging voltage of Vc or more after the feeding of Kr/Ne mixed gas on the previous occasion (step 141). This time Tv is then compared with the Kr/Ne mixed gas feeding interval time Tg (step 142), and, if Tv>Tg, next, the total pressure P is compared with the total pressure Pa after completion of feeding (step 143). If the result of this comparison is that P<Pa, after a fixed quantity of Kr/Ne mixed gas has been fed (step 144), the procedure returns to the main routine. It should be noted that, in the comparison of step 140, if V$\leq$Vc or, in the comparison of step 142, if Tv$\leq$Tg, or, in the comparison of step 143, if P$\geq$Pa, no action is taken as the procedure returns to the main routine.

Furthermore, in the above step 144, a fixed quantity of Kr/Ne mixed gas is fed by opening valve 5 for a fixed time.

Thus, with the Kr/Ne mixed gas feeding subroutine as described above, if the charging voltage V exceeds a prescribed threshold value Vc, a prescribed amount of Kr/Ne mixed gas is fed corresponding to the condition in which the charging voltage becomes equal to or greater than the aforesaid threshold value over a prescribed time interval (Tg), so laser output can be subjected to a fixed control that is reliable and highly accurate, due to the feeding of rare gas/buffer gas in fixed amount in the gas supply control.

In this way, when the processing of the Kr/Ne mixed gas feeding subroutine 1 is completed, next, the fluorine partial pressure Fp is calculated from the F2 concentration F and total pressure P (step 105 in FIG. 2). The difference ΔFp between this F2 partial pressure Fp and the target F2 partial pressure Fc is then calculated (step 106). This difference ΔFp is then compared with the allowed width ΔFc of the target F2 partial pressure (step 107), and if |ΔFp|≧ΔFc, the procedure advances to the F2 feeding subroutine 1 shown in FIG. 5 (step 108*a*), while if |ΔFp|<ΔFc, the procedure enters the charging voltage instruction subroutine shown in FIG. 6 (step 109).

Figure 5:
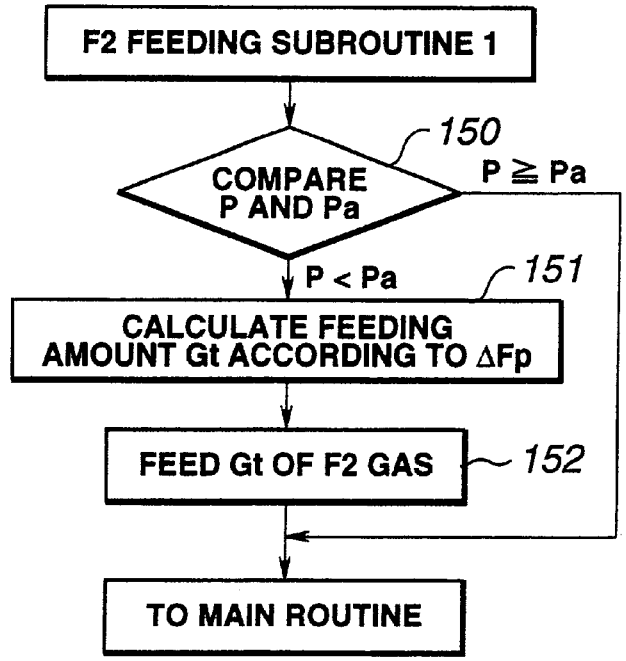
FIG. 5 is a flow chart illustrating F2 feeding subroutine 1.

In the F2 feeding subroutine 1 of FIG. 5, total pressure P and total pressure Pa on completion of feeding are compared (step 150); if P≧Pa, the procedure returns to the main routine; if P<Pa, a feeding amount Gt is calculated in accordance with ΔFp that was previously calculated (step 151); F2 gas in the amount of this calculated feeding amount Gt is then fed and the procedure returns to the main routine (step 152).

In this way, in the F2 gas feeding subroutine 1, the F2 gas partial pressure Fp is detected and a halogen gas supplementation amount corresponding to this detected partial pressure value Fp is determined; halogen gas can therefore be supplied precisely in the amount of the actual diminution of the halogen gas.

It should be noted that, although, in this case, a quantity of F2 gas corresponding to ΔFp was fed, it would be possible to arrange to feed always a prescribed quantity of F2 gas, irrespective of ΔFp. Also, although, in this embodiment, the F2 partial pressure was controlled to a fixed value, it would be possible to control the F2 concentration to a fixed value.

Thus, when the F2 feeding subroutine 1 is completed, the procedure shifts to the charging voltage instruction subroutine.

Figure 6:
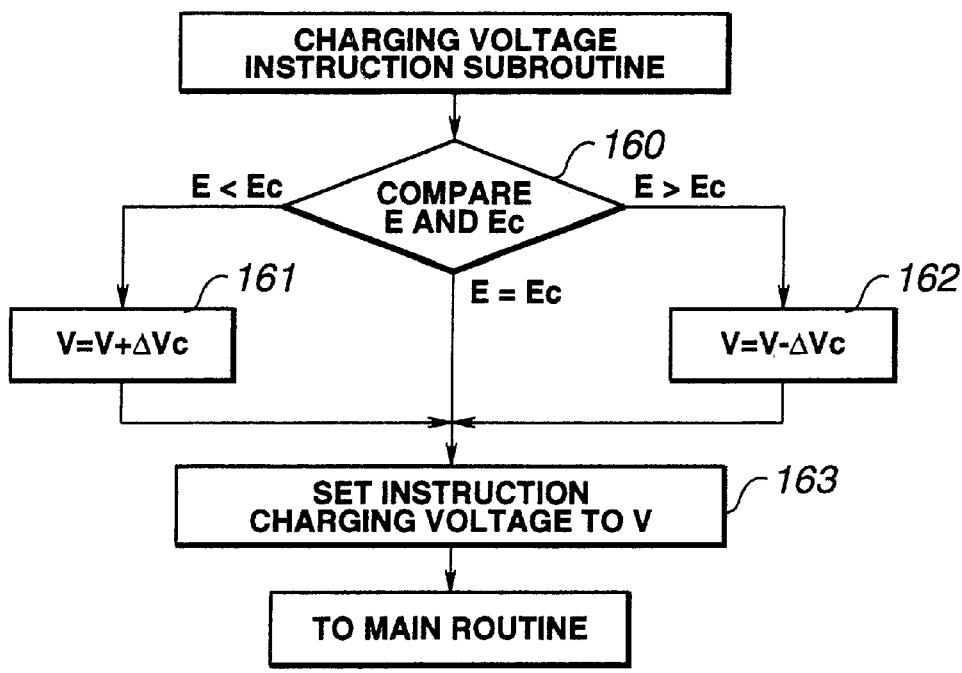
FIG. 6 is a flow chart showing a charging voltage instruction subroutine.

The charging voltage instruction subroutine shown in FIG. 6 is a routine for setting charging voltage V corresponding to laser output E. In this charging voltage instruction subroutine, the detected laser output E is compared with the rated laser output Ec (step 160); if E<Ec, an increment/decrement ΔVc is added to charging voltage V (step 161) such as to raise laser output to the rated output, and the result of this addition (V+ΔVc) is output to discharge power source 3 as instruction charging voltage V (step 163). Also, if the result of the comparison performed in step 160 is that E=Ec, the detected charging voltage V is output to discharge power source 3 as instruction charging voltage (step 163). Furthermore, if the result of the comparison of step 160 is that E>Ec, an increment/decrement ΔVc is subtracted from charging voltage V such as to make the laser output fall to the rated output (step 161); the result of this subtraction (V−ΔVc) is output to discharge power source 3 as instruction charging voltage V (step 163).

Figure 7:
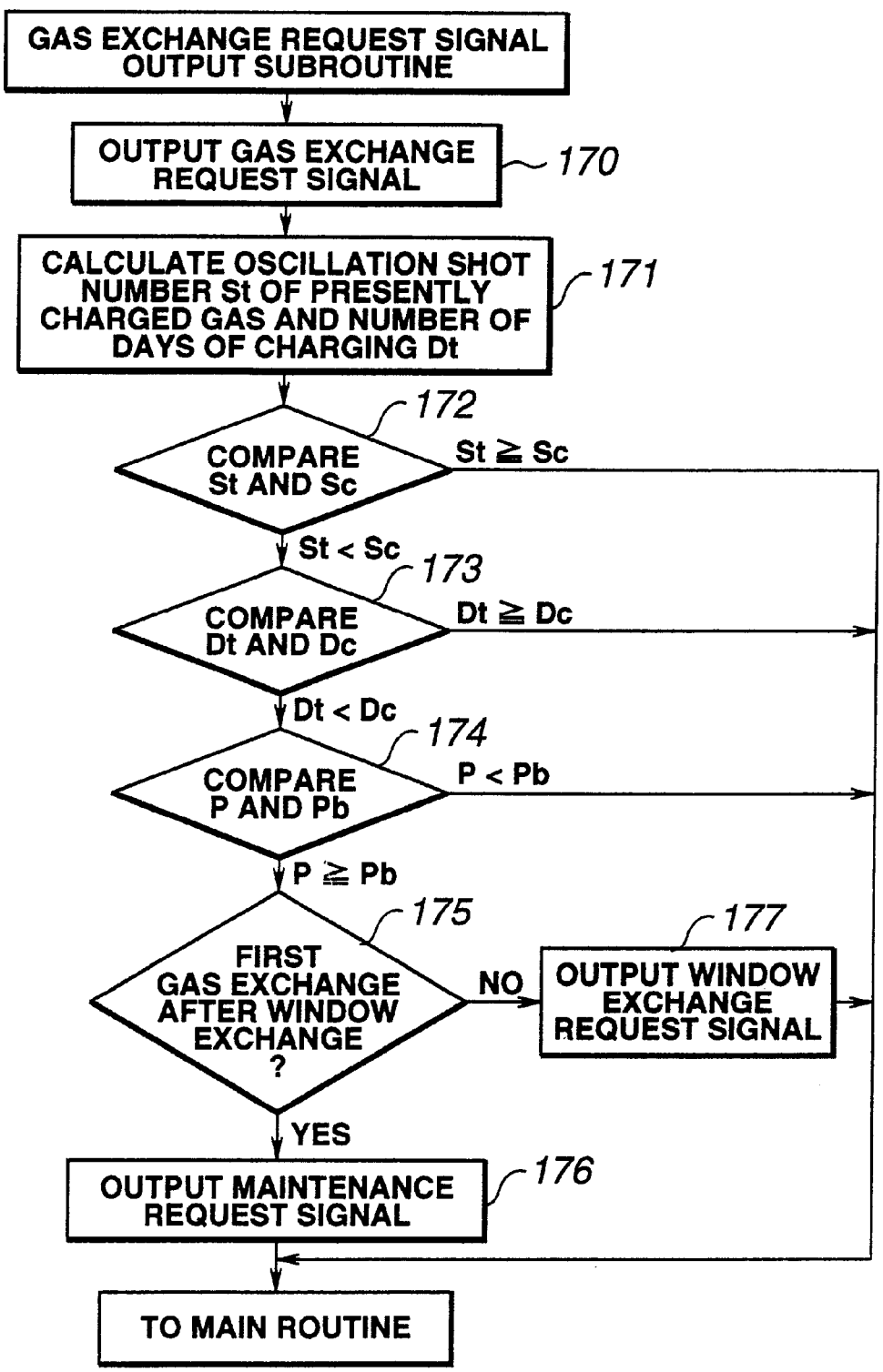
FIG. 7 is a flow chart showing a gas exchange request signal output subroutine.

When the charging voltage instruction subroutine has been completed as above, charging voltage V is compared with charging voltage upper limit value Va (step 110); if the result is that V≦Va, the procedure again shifts to step 103 and the same processing as described above is performed; however, if the result of the comparison is that V>Va, the procedure advances to the gas exchange request signal output subroutine shown in FIG. 7.

This gas exchange request signal output subroutine is a subroutine for outputting a gas exchange request signal, a window exchange request signal of laser chamber 1, and a maintenance request signal.

In the gas exchange request signal output subroutine shown in FIG. 7, first of all, a gas exchange request signal is output from controller 10 (step 170), and the operator is thereby alerted to the fact that the instruction charging voltage V has got outside the allowed range, and a display or warning tone prompting gas exchange is issued.

Next, controller 10 calculates the oscillation shot number St of the presently charged gas, and the gas charging time (number of days) Dt (step 171). This number of oscillation shots St is then compared with the lower limit value Sc of oscillation shots for a single gas charge (step 172); if St≧Sc, the procedure returns to the main routine; if St<Sc, the previously found gas charging time Dt is compared with the lower limit value of the charging time for a single gas charge (step 173). If the result of this comparison is that Dt≧Dc, the procedure returns to the main routine; if Dt<Dc, next, the gas total pressure P is compared with the threshold value Pb (step 174). Then, if P<Pb, the procedure returns to the main routine; if P≧Pb, it is ascertained whether or not the exchange of gas on the current occasion is the first time the gas has been exchanged after window exchange (in other words, whether the present gas is the gas that was first introduced after window exchange) (step 175). Then, if this is not the first gas change, a window exchange request signal is output to perform a warning action to that effect; when, in response to this, the window is exchanged, the procedure returns to the main routine (step 177).

Also, if this in fact the first gas change, a maintenance request signal is output to warn the operator to that effect so that maintenance/inspection can be carried out, after which the procedure returns to the main routine (step 176).

Thus, with this first embodiment, before laser oscillation, the drop in laser output produced by a protracted period of stoppage is compensated for by feeding Kr/Ne mixed gas in an amount corresponding to the period T of oscillation stoppage. Also, after laser oscillation, laser output compensation control is performed whereby Kr/Ne mixed gas is fed in an amount responsive to the charging voltage and the F2 gas is supplemented in an amount responsive to the partial pressure value of the F2 gas, and, furthermore, the charging voltage is increased or decreased in response to the result of a comparison of laser output with rated laser output until the charging voltage rises up to a prescribed upper limiting value.

Second embodiment

Figure 8:
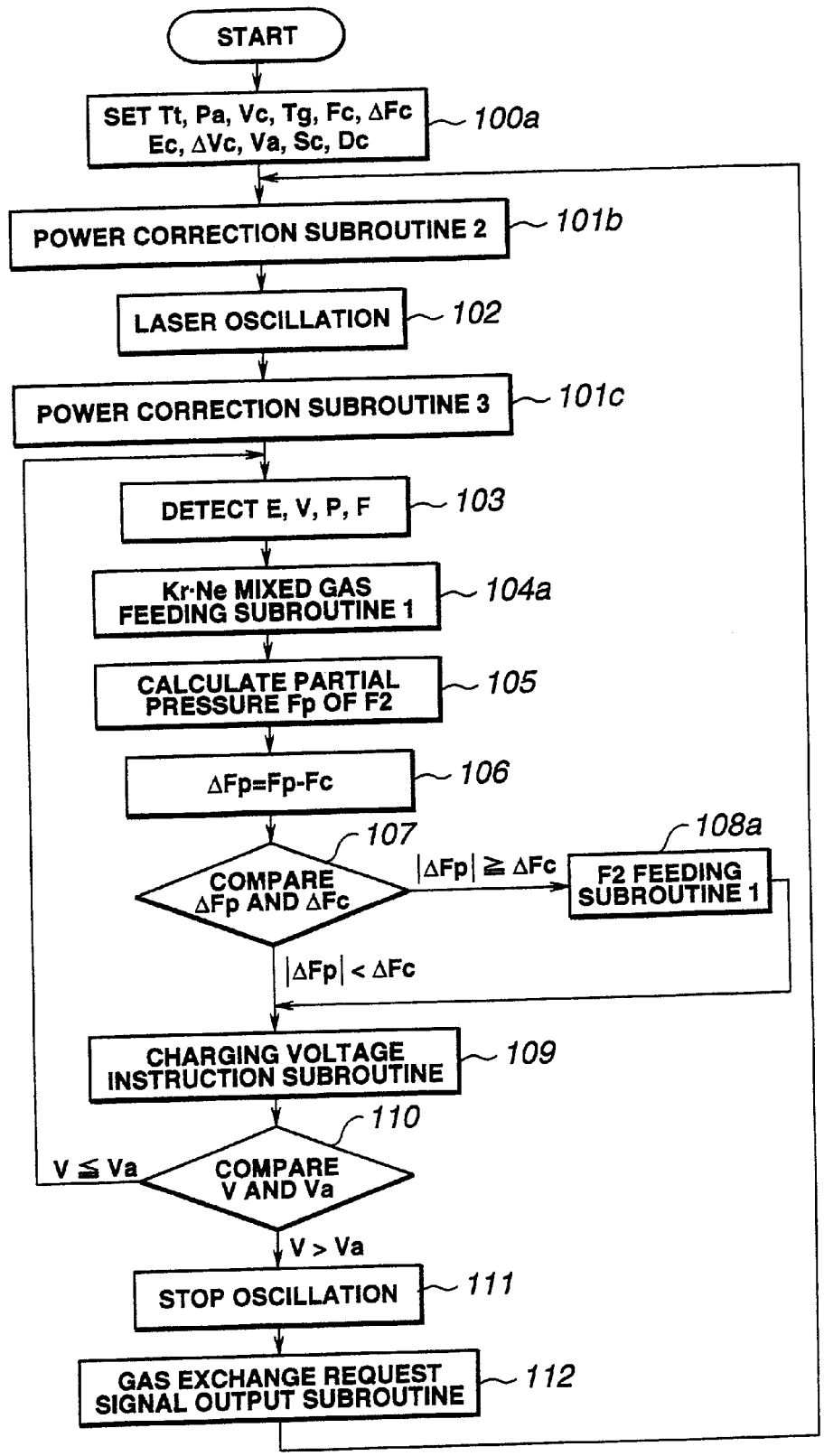
FIG. 8 is a main routine flow chart showing a second embodiment of the present invention.

Next, a second embodiment, which is a modification of the first embodiment, will be described with reference to the flow charts of FIG. 8 to FIG. 10. This second embodiment is the same as the first embodiment except for the fact that the power correction subroutine 1 of the main routine of FIG. 2 of the first embodiment described above is changed to power correction subroutine 2 (step 101*b* in FIG. 8), and that a power correction subroutine 3 (step 101*c*) is added as a power correction after laser oscillation. Description which would be duplicated is omitted.

Figure 9:
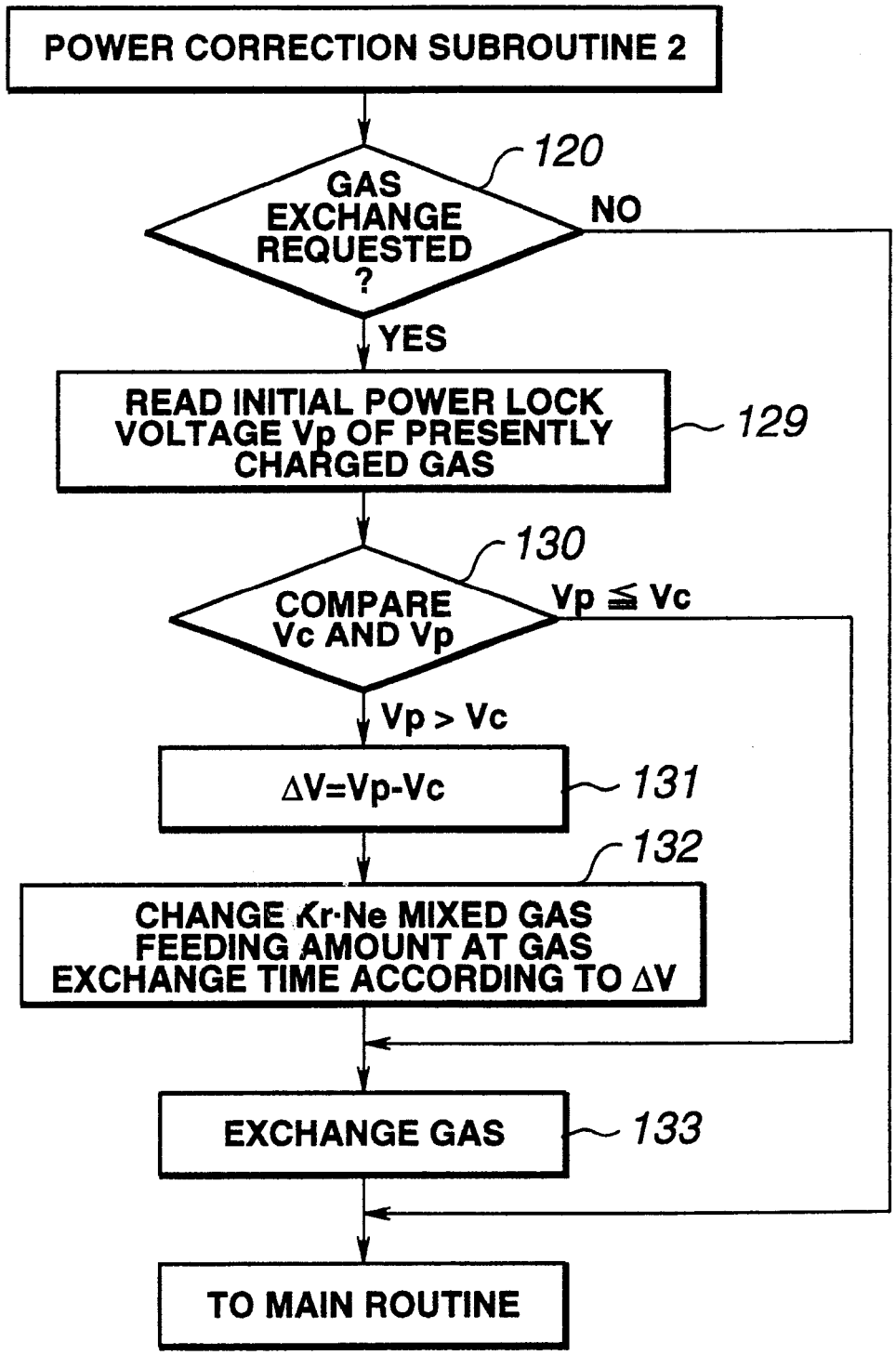
FIG. 9 is a flow chart showing power correction subroutine 2.

Power correction subroutine 2 shown in FIG. 9 omits step 121 to step 128 of power correction subroutine 1 of the first embodiment above.

In more detail, first of all, controller 10 checks to see whether there is a gas exchange request signal (step 120 in FIG. 9); if there is an exchange request, it reads (step 129) from the memory table the initial power lock voltage Vp of the presently charged gas, and compares this power lock charging voltage Vp with the Kr/Ne mixed gas feeding charging voltage Vc (step 130). If the result of this comparison is that Vp≦Vc, gas exchange is performed with the same gas composition as in the gas exchange performed on the previous occasion (step 133). However, if Vp>Vc, gas exchange is performed (steps 132, 133) with an altered charging pressure of the Kr/Ne mixed gas, corresponding to ΔV (=Vp-Vc).

Also, if, in step 120, there is no request for gas exchange, controller 10 returns to the main routine.

Figure 10:
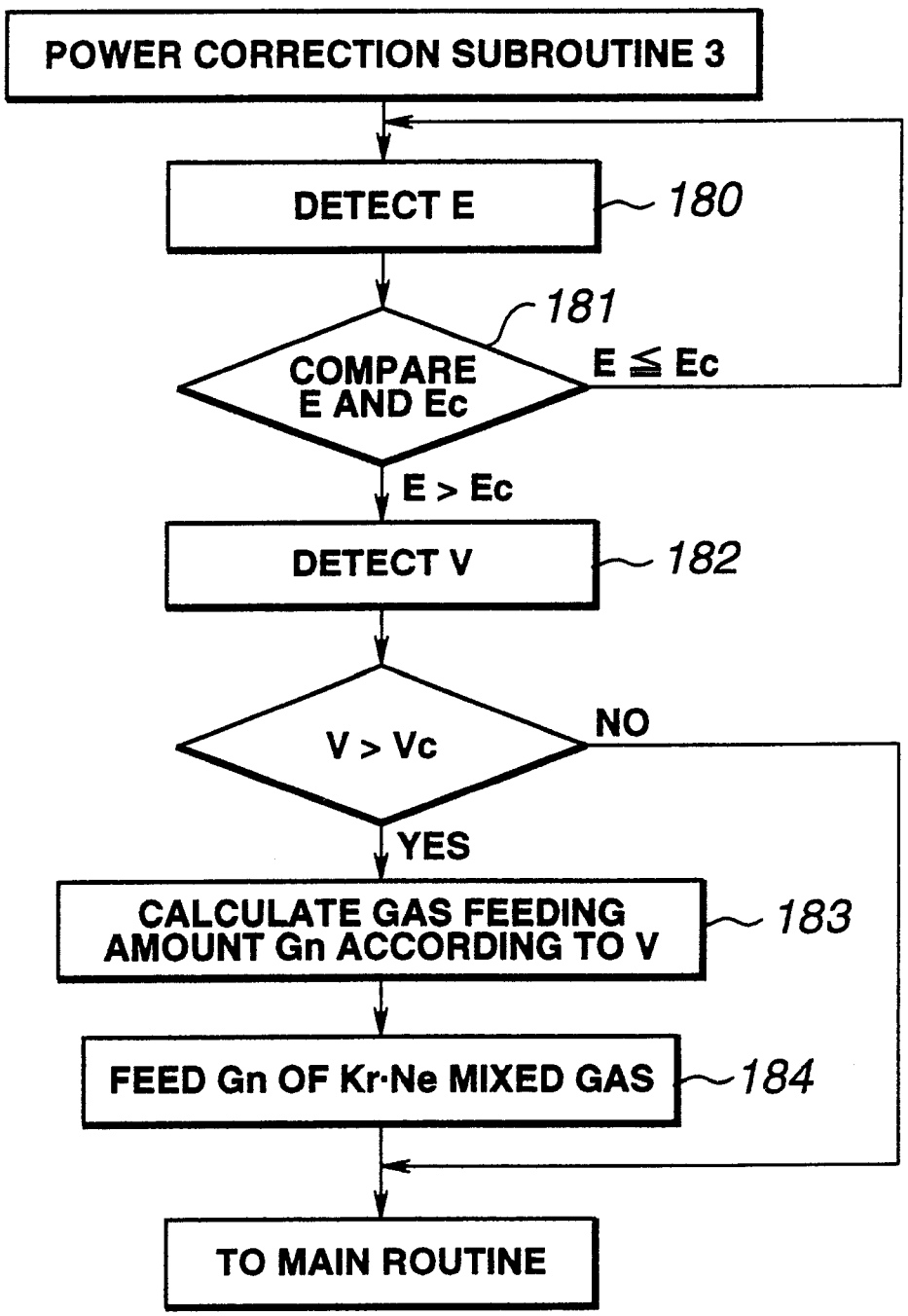
FIG. 10 is a flow chart showing power correction subroutine 3.

The power correction subroutine 3 shown in FIG. 10 is a procedure that is performed after laser excitation, in order to compensate for the drop in laser output produced by prolonged laser stoppage and is a substitute procedure for step 121 to step 128 of power correction subroutine 1 of the first embodiment, which was omitted in power correction subroutine 2 above.

In this power correction subroutine 3, the charging voltage 3 when laser output E has reached rated output Ec is detected (steps 180 to 182), and, if V>Vc, a feeding amount Gn of Kr/Ne mixed gas corresponding to this charging voltage is calculated (step 183), and this calculated amount Gn of Kr/Ne mixed gas is fed, after which the procedure returns to the main routine. That is, in this second embodiment, even when the laser has been stopped for a long time, laser oscillation is commenced without feeding of Kr/Ne gas and then subsequently an amount of Kr/Ne mixed gas corresponding to the charging voltage value after laser oscillation is fed at once. Consequently, even if, because of the long period of stoppage, the laser was in a condition in which the charging voltage V was higher than at first, it is possible to feed all at once a large quantity of rare gas and buffer gas corresponding to this large charging voltage value; thus, the charging voltage value can be lowered all at once, compared with the conventional system, in which the quantity of gas feeding is fixed.

It should be noted that, in this second embodiment, just as in the first embodiment above, the feeding amount Gn of Kr/Ne mixed gas may be calculated from the time T of oscillation stoppage. Also, since, if several Torr of Kr/Ne mixed gas are fed at one time during laser oscillation this will produce considerable fluctuation of laser output, it is preferable to feed Kr/Ne mixed gas feeding amounts Gn above 3 Torr in several separate smaller amounts.

Third embodiment

Figure 11:
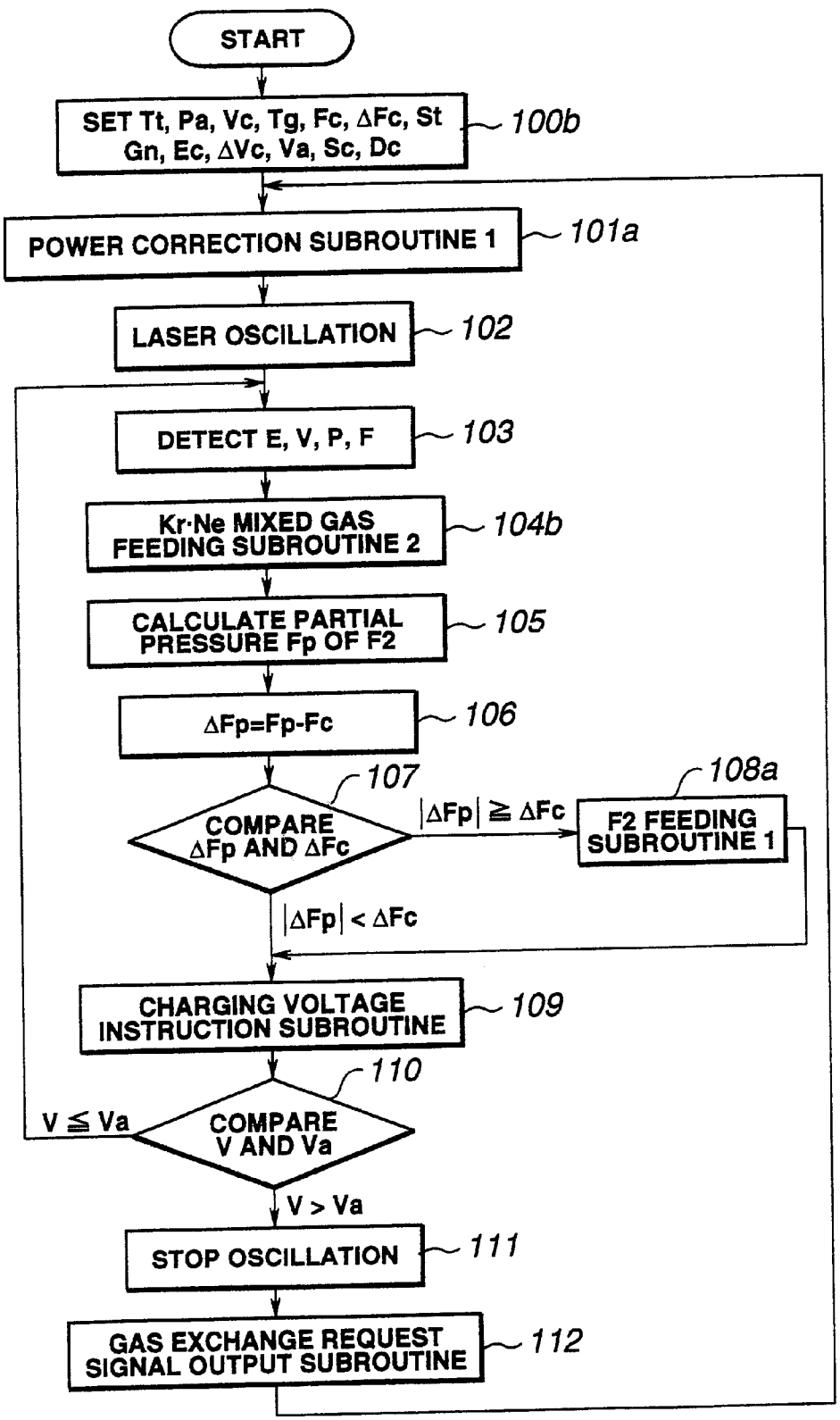
FIG. 11 is a main routine flow chart showing a third embodiment of the present invention.

A third embodiment of the present invention is described below with reference to FIG. 11 to FIG. 12.

Figure 12:
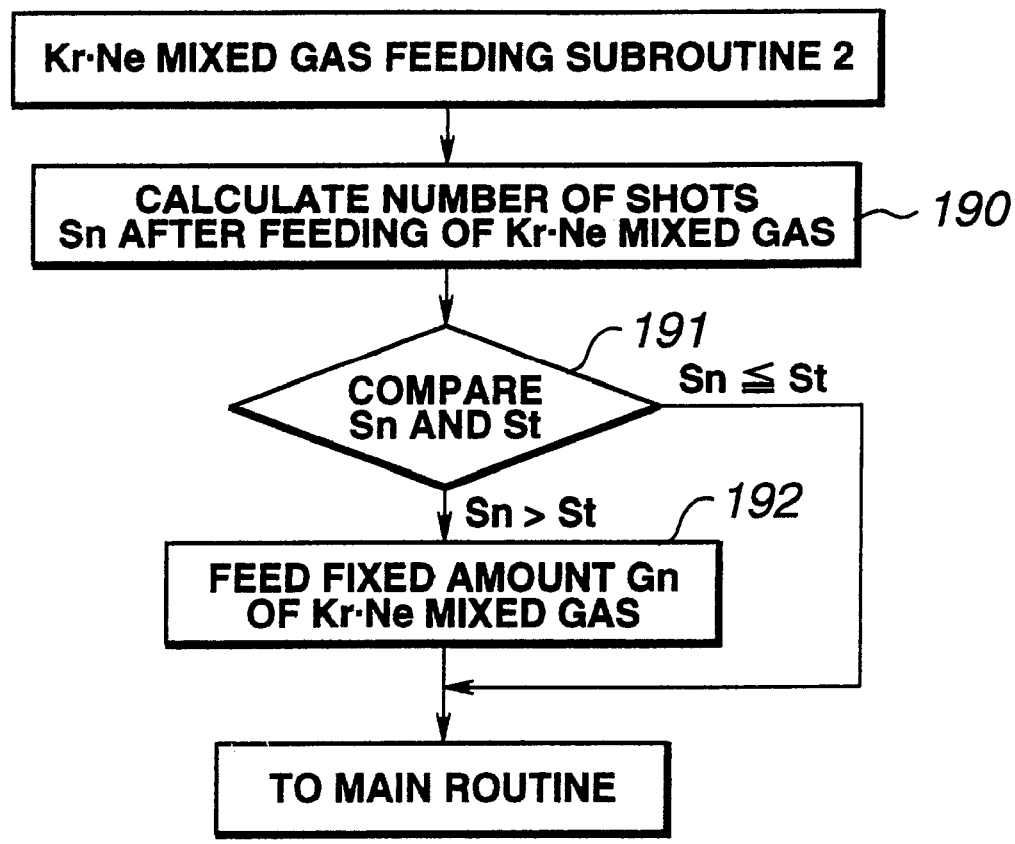
FIG. 12 is a flow chart showing a Kr/Ne mixed gas feeding subroutine 2.

In this third embodiment, the Kr/Ne mixed gas feeding subroutine 1 (step 104a of FIG. 2) of the first embodiment above is replaced by the Kr/Ne mixed gas feeding subroutine 2 (step 104b in FIG. 11) shown in FIG. 12. Also, the Kr/Ne mixed gas feeding amount Gn is added to the initially set parameters in step 100b. Apart from this, it is exactly the same as the first embodiment.

Specifically, in the Kr/Ne mixed gas feeding subroutine 2 of FIG. 12, the laser shot number Sn after feeding of Kr/Ne mixed gas is calculated (step 190) and this shot number Sn and the shot number St (fixed value) of the interval in which Kr/Ne mixed gas is fed are compared (step 191); if Sn≦St, the procedure returns to the main routine, while if Sn>St, the Kr/Ne mixture is fed in a fixed amount Gn that was initially set; the procedure then returns to the main routine (step 192).

Specifically, in this Kr/Ne mixed gas feeding subroutine 2, the number of laser shots after the feeding of Kr/Ne mixed gas on the previous occasion is calculated, and if this shot number exceeds a prescribed threshold value, mixed gas is fed; the feeding of rare gas is therefore performed in a manner which is based on the number of laser shots, which is directly related to the rate of laser oscillation; constant control of laser output with precision and high accuracy can thereby be achieved.

Fourth embodiment

A fourth embodiment of the present invention will now be described with reference to FIG. 13 to FIG. 15.

Figure 13:
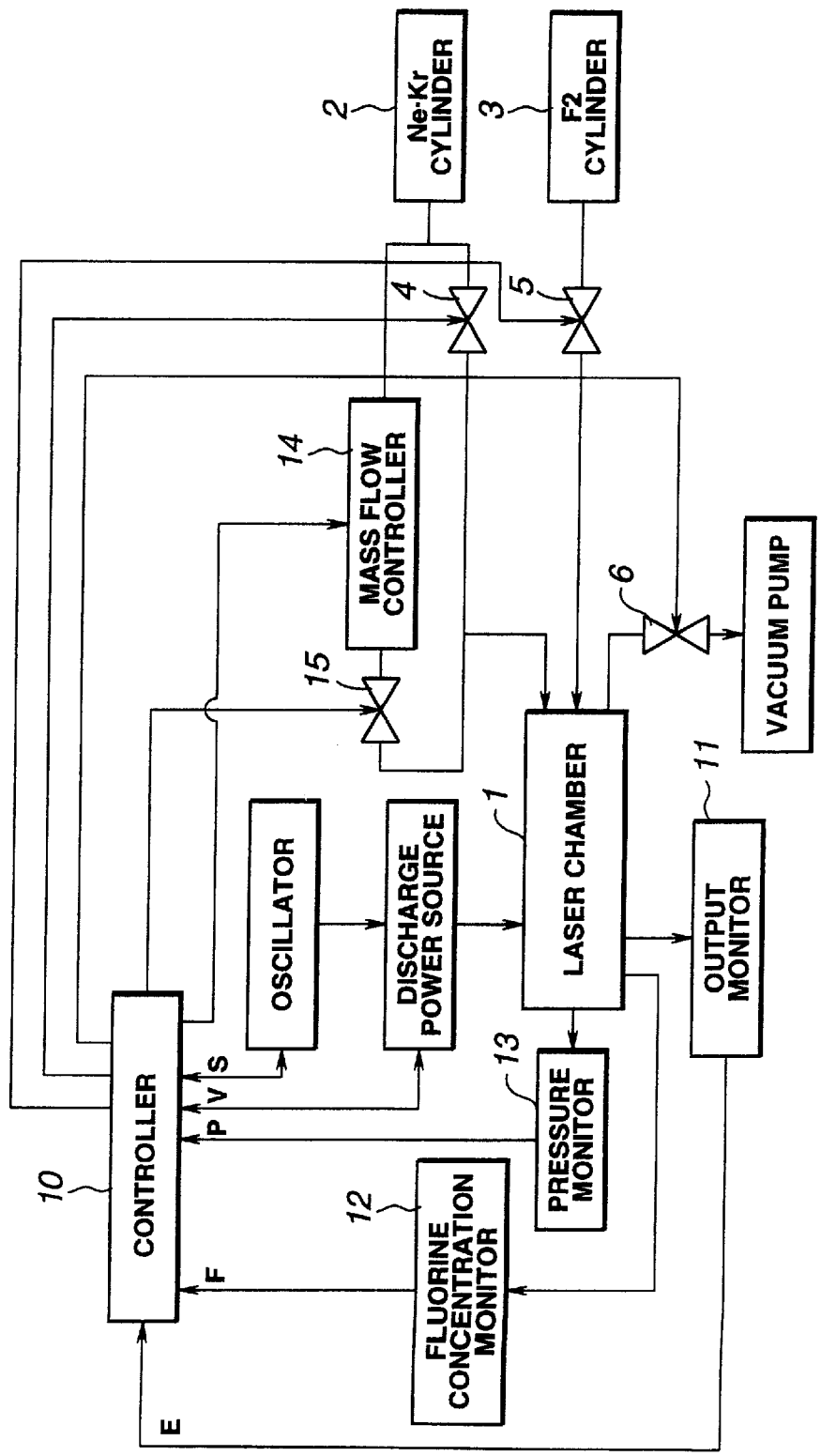
FIG. 13 is a block diagram showing a fourth embodiment of this invention.

In the fourth embodiment shown in FIG. 13, a mass flow controller (mass flow control device) 14 and on/off valve 15 for the Kr/Ne mixed gas supply are added to the construction of FIG. 1 above.

Specifically, if several Torr of Kr/Ne mixed gas are fed at once, the laser output fluctuates. The amount of this fluctuation becomes less as the amount of feeding on a single occasion is decreased. With feeding using an on/off valve 4, the minimum that can be fed is about 1 Torr, but if a mass flow controller 14 is employed, more minute amounts of feeding are possible enabling fluctuation of laser output to be suppressed. This is the reason for employing a mass flow controller 14.

Figure 14:
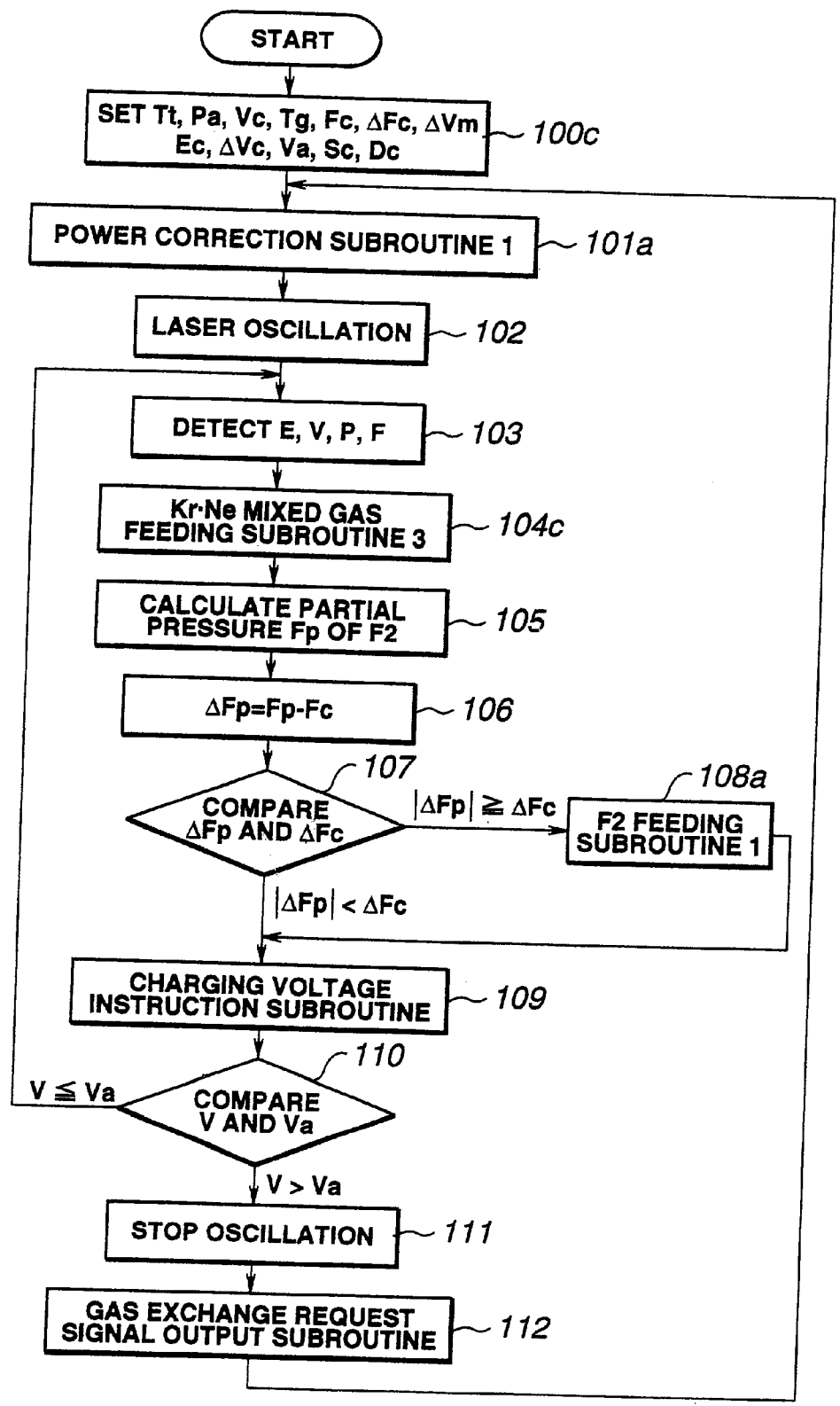
FIG. 14 is a main routine flow chart showing a fourth embodiment of the present invention.

FIG. 14 shows the main routine of this fourth embodiment. In this fourth embodiment, the Kr/Ne mixed gas feeding subroutine 1 of the first embodiment is replaced by the Kr/Ne mixed gas feeding subroutine 3 (step 104c of FIG. 14) shown in FIG. 15. Also, the allowed width ΔVm of the charging voltage is added to the initially set parameters in step 100c. Aside from this, this embodiment is the same as the first embodiment above.

Figure 15:
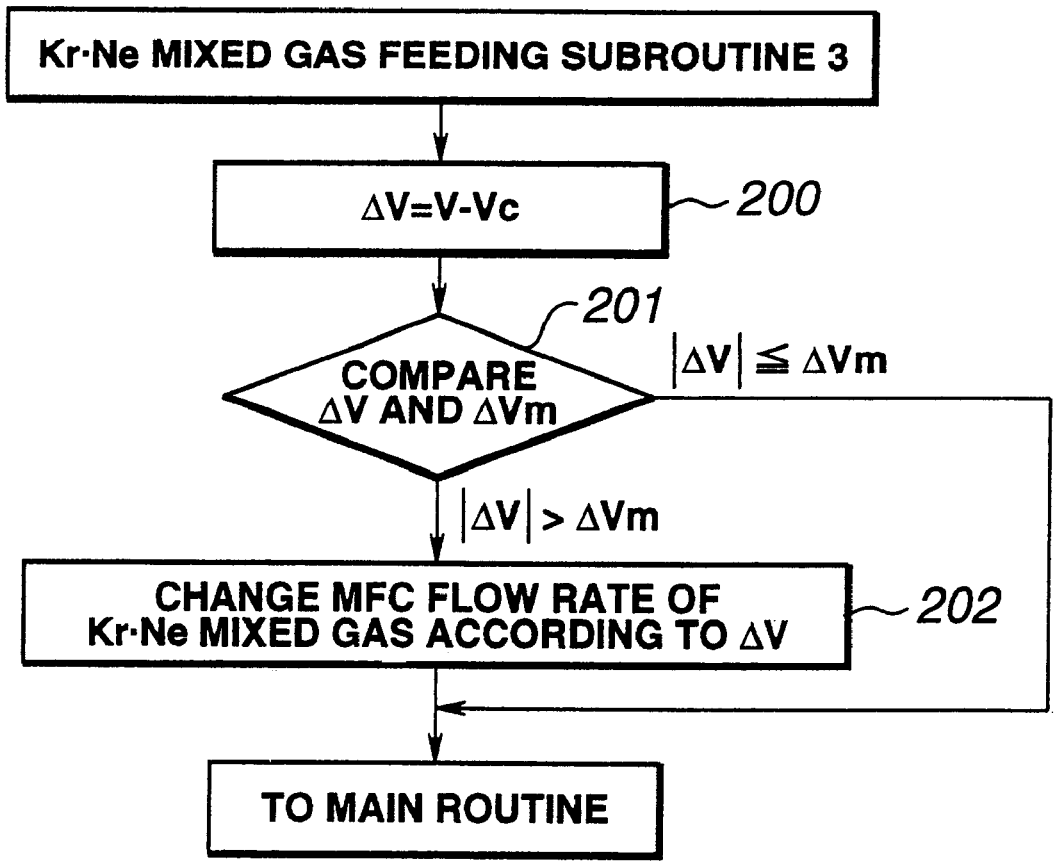
FIG. 15 is a flow chart showing a Kr/Ne mixed gas feeding subroutine 3.

In the Kr/Ne mixed gas feeding subroutine 3 of FIG. 15, the difference ΔV (=V-Vc) of the charging voltage V and Kr/Ne mixed gas feeding charging voltage Vc is found (step 200), and this difference ΔV is compared with the permitted width ΔVm of the charging voltage (step 201). If the result of this comparison is that |ΔV|>ΔVm, the flow rate of Kr/Ne mixed gas of the mass flow controller is altered (step 202) and the procedure then returns to the main routine; if the result is that |ΔV|≦ΔVm, no action is taken and the procedure returns to the main routine.

It should be noted that, although in the embodiments described above, on/off valve 15 was always open, if the flow rate of mass flow controller 14 is made constant, on/off valve 15 can be on/off controlled in accordance with ΔV.

Fifth embodiment

A fifth embodiment of the present invention will be described with reference to FIG. 16 to FIG. 18.

Figure 16:
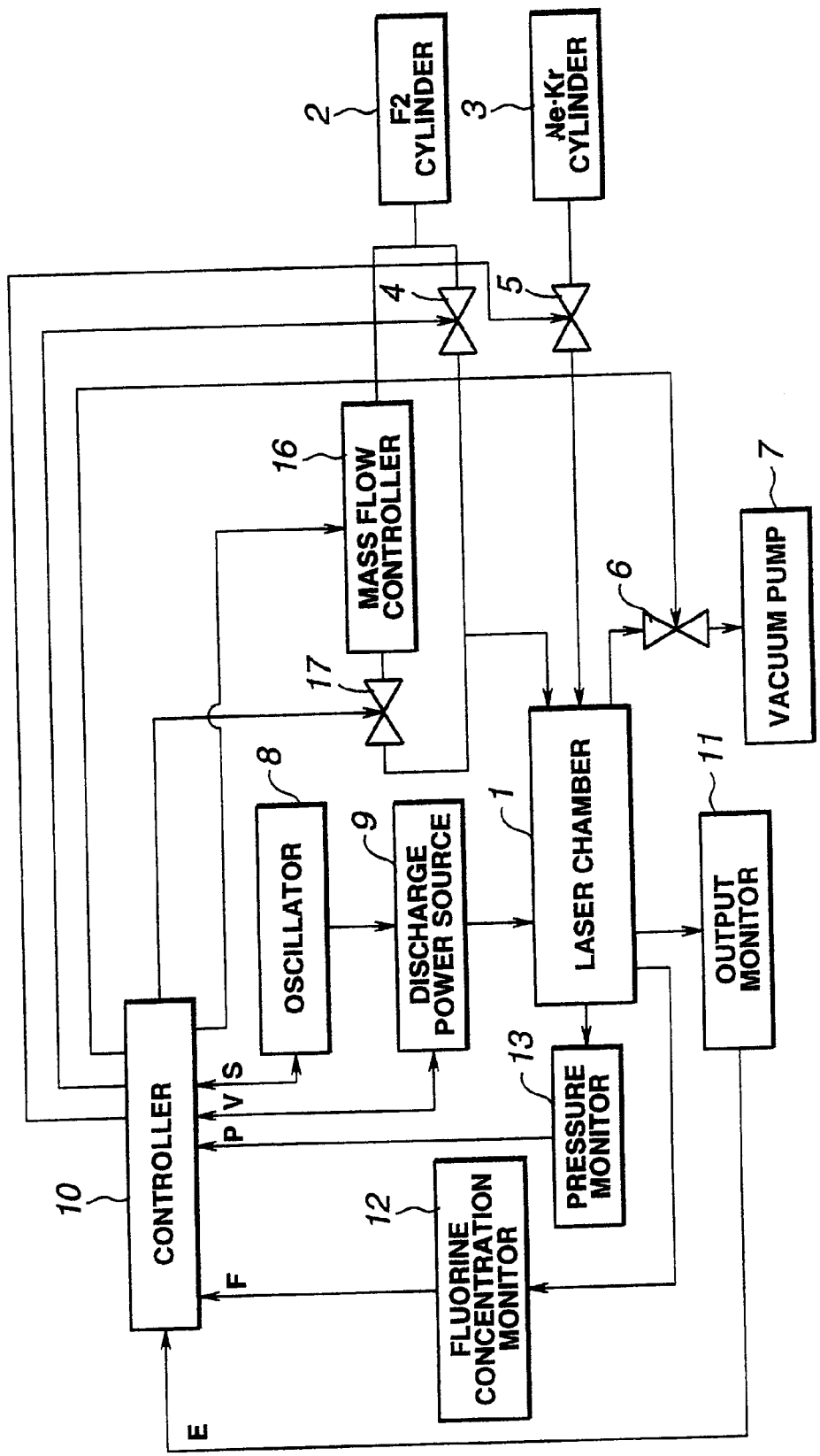
FIG. 16 is a block diagram showing a fifth embodiment of this invention.

In the fifth embodiment shown in FIG. 16, fluctuation of laser output due to fluorine gas feeding is prevented by adding a mass flow controller 16 and on/off valve 17 for supply of F2 gas to the construction of FIG. 1 above.

Specifically, in this fifth embodiment, the amount of gas passing through a gas supplementation path is controlled so that the mass flow rate of halogen gas that is supplied by mass flow controller 16 is the desired fixed value.

Figure 17:
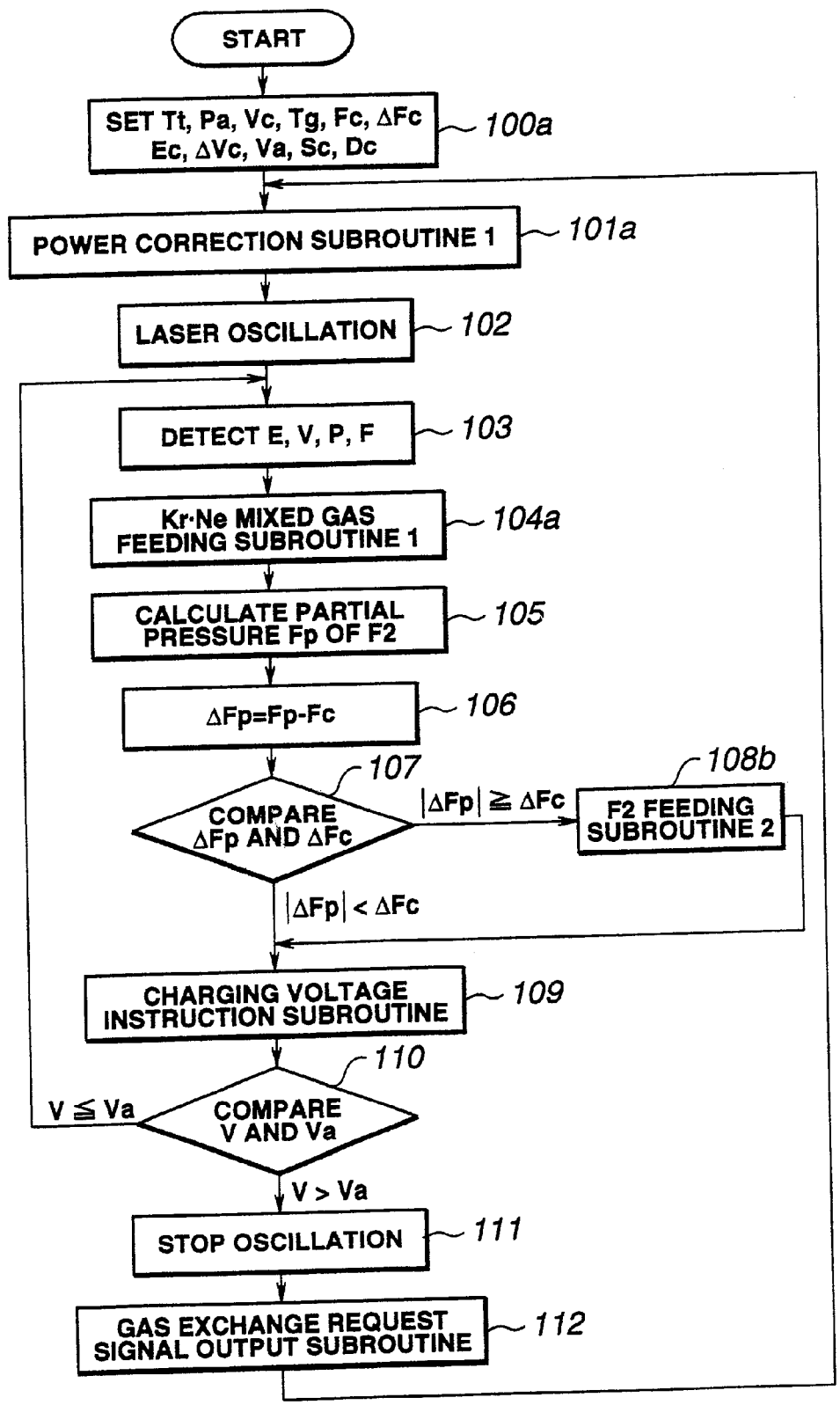
FIG. 17 is a main routine flow chart showing a fifth embodiment of the present invention.
Figure 18:
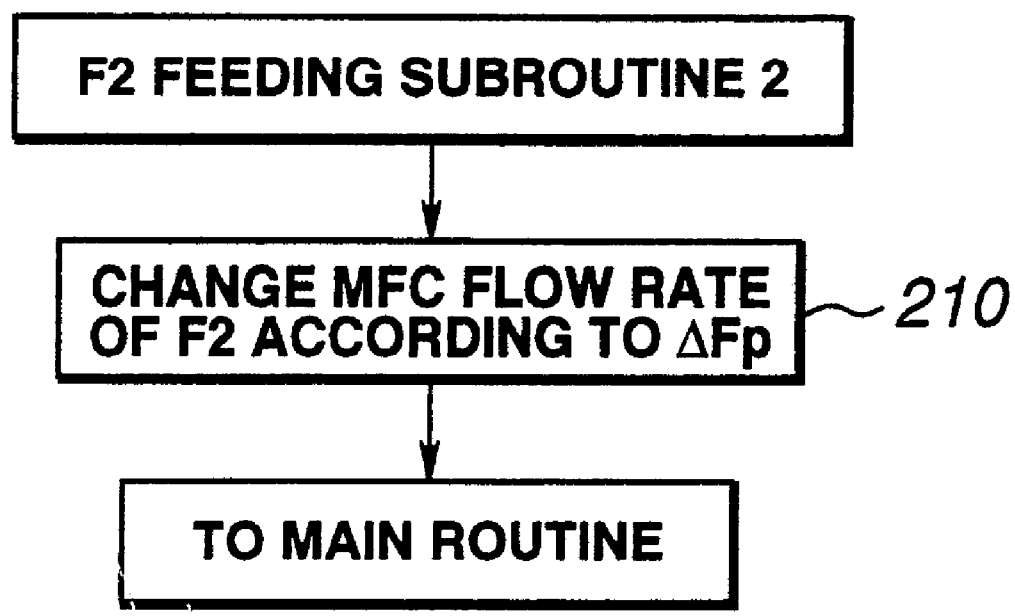
FIG. 18 is a flow chart showing F2 feeding subroutine 2.

FIG. 17 shows the main routine according to this fifth embodiment; the F2 gas feeding subroutine 1 of the first embodiment above is replaced by the F2 gas feeding subroutine 2 (step 108b in FIG. 17) shown in FIG. 18. Otherwise, this embodiment is exactly the same as the first embodiment above.

In the F2 gas feeding subroutine 2 shown in FIG. 18, the flow rate of fluorine gas supplied at mass flow controller 16 is altered in accordance with ΔFp (=Fp-Fc).

It should be noted that, although in the embodiment described above on/off valve 17 is always open, it could be arranged to keep the flow rate of mass flow controller 16 constant and to perform on/off control of on/off valve 17 in response to ΔFp.

Sixth embodiment

Figure 19:
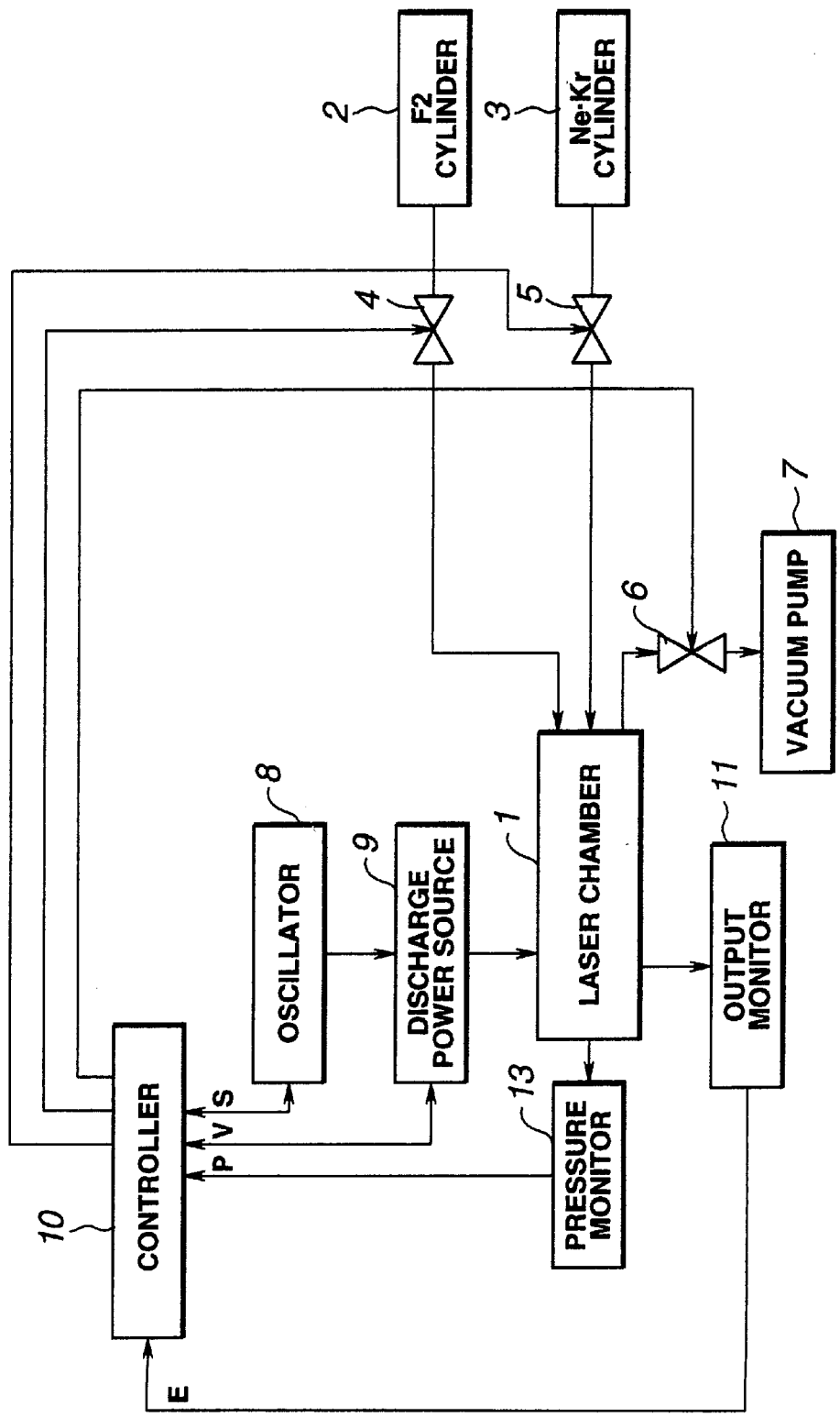
FIG. 19 is a block diagram showing a sixth embodiment of this invention.

In the sixth embodiment shown in FIG. 19, neither the fluorine concentration monitor 12 of FIG. 1 nor the spectral width monitor 20 adopted in subsequent embodiments are provided. That is, in this sixth embodiment, insufficiency of F2 is inferred from the laser shot number after feeding of fluorine gas and if the F2 is judged to be insufficient, a previously set fixed quantity of fluorine is supplied.

Figure 20:
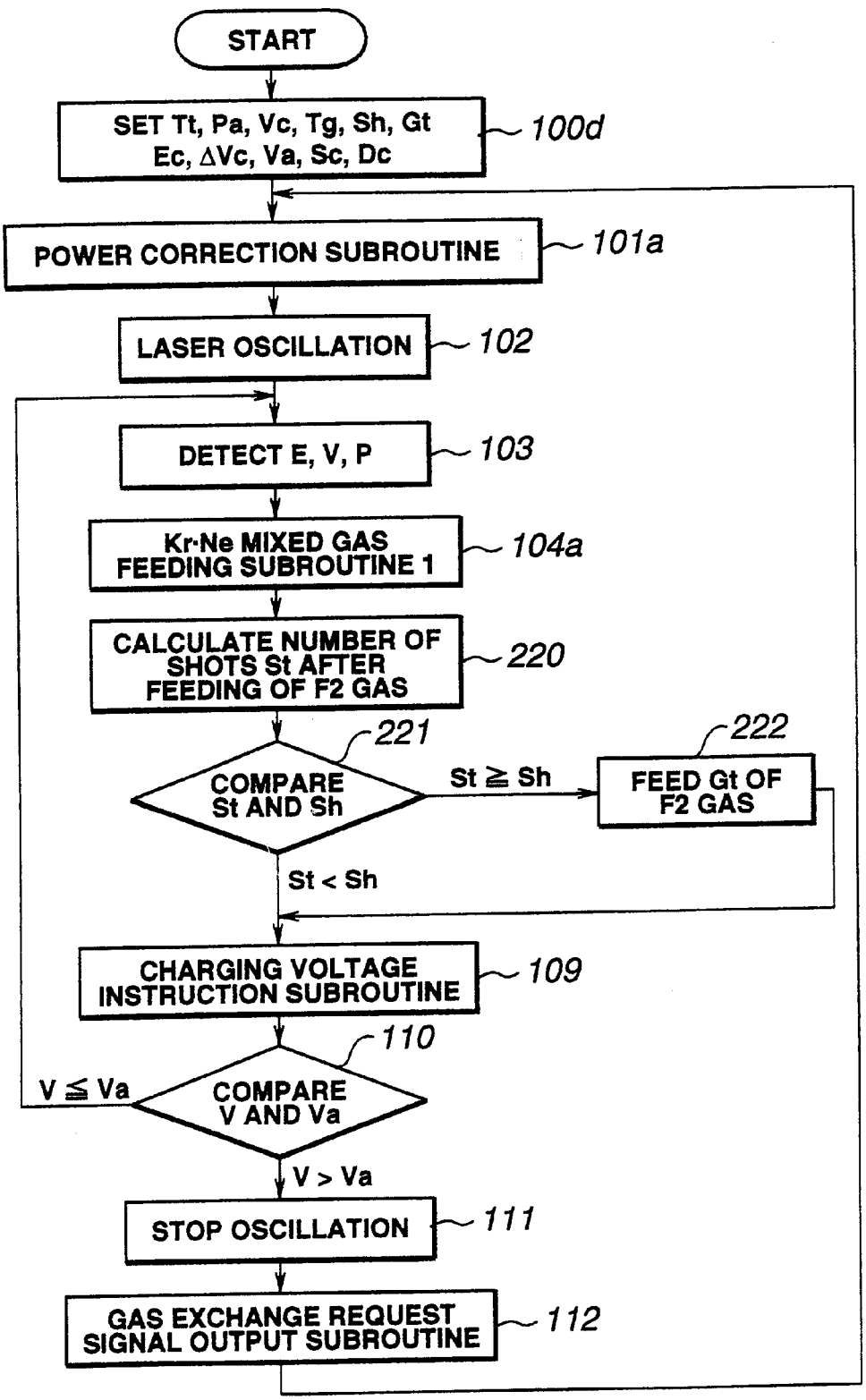
FIG. 20 is a main routine flow chart showing a sixth embodiment of the present invention.
Figure 21:
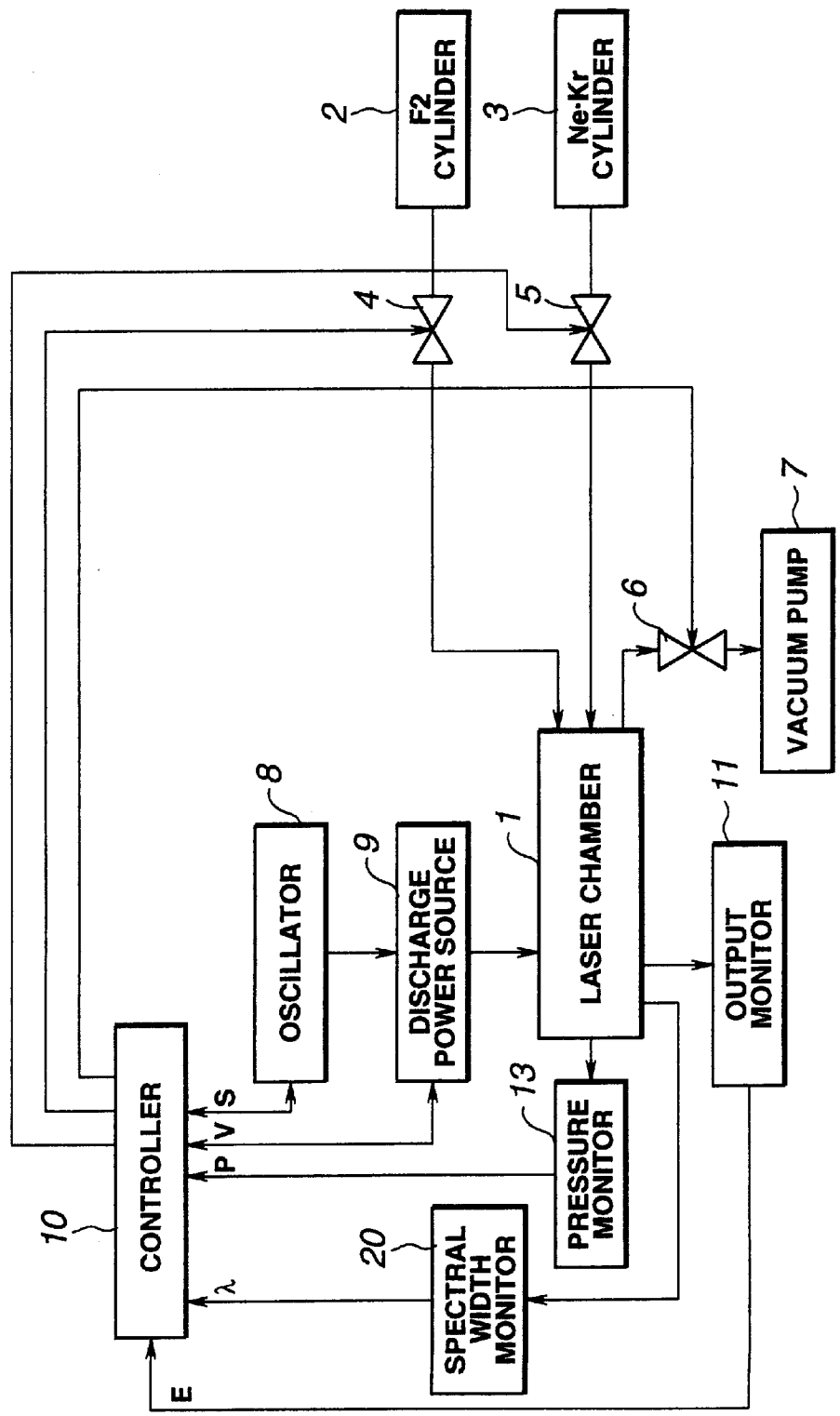
FIG. 21 is a block diagram showing a seventh embodiment of this invention.

FIG. 20 shows the main routine of this sixth embodiment; in this embodiment, the fluorine feeding processing procedure (step 105 to step 108a) of the first embodiment is replaced by the procedure of step 220 to step 222). Also, in the initial setting of parameters of step 100d, the feeding amount Gt of F2 gas is set. Otherwise this embodiment is exactly the same as the first embodiment.

Specifically, when the Kr/Ne mixed gas feeding subroutine 1 terminates (step 104a), the number of shots St since feeding of fluorine gas on the previous occasion is calculated (step 220), and this calculated value St and the number of shots Sh in the F2 feeding interval are compared (step 221). Then, if St≧Sh, the previously set fixed quantity Gt of F2 gas is fed (step 222); if St<Sh, the following step is executed.

Seventh embodiment.

A seventh embodiment is described with reference to FIG. 21 to FIG. 25.

In this seventh embodiment, in place of the fluorine concentration monitor, a spectral line width monitor 20 is provided; this embodiment is applied to lasers of narrow bandwidth.

Specifically, in a narrow-bandwidth laser, the spectral line width must be kept below a prescribed value, but, as the spectral line width becomes smaller, the oscillation efficiency of the laser decreases. It is therefore effective to have the laser oscillate with its spectral line width controlled such as to be in the neighborhood of a prescribed value.

In this connection, noting that the spectral line width λ has a close correlation with the fluorine partial pressure Fp, the present inventors arranged to determine the halogen feeding amount in accordance with the spectral line width λ, which is in inverse proportional relationship with the number of molecules of halogen gas. Specifically, if the spectral line width is controlled such as to be a prescribed target value, the spectral line width becomes narrower as halogen gas is consumed, so, in this case, the halogen gas supply rate is increased such as to make the spectral line width broader. Also, when the spectral line width has broadened, the halogen gas supply rate is diminished so as to make the spectral line width narrower.

Figure 22:
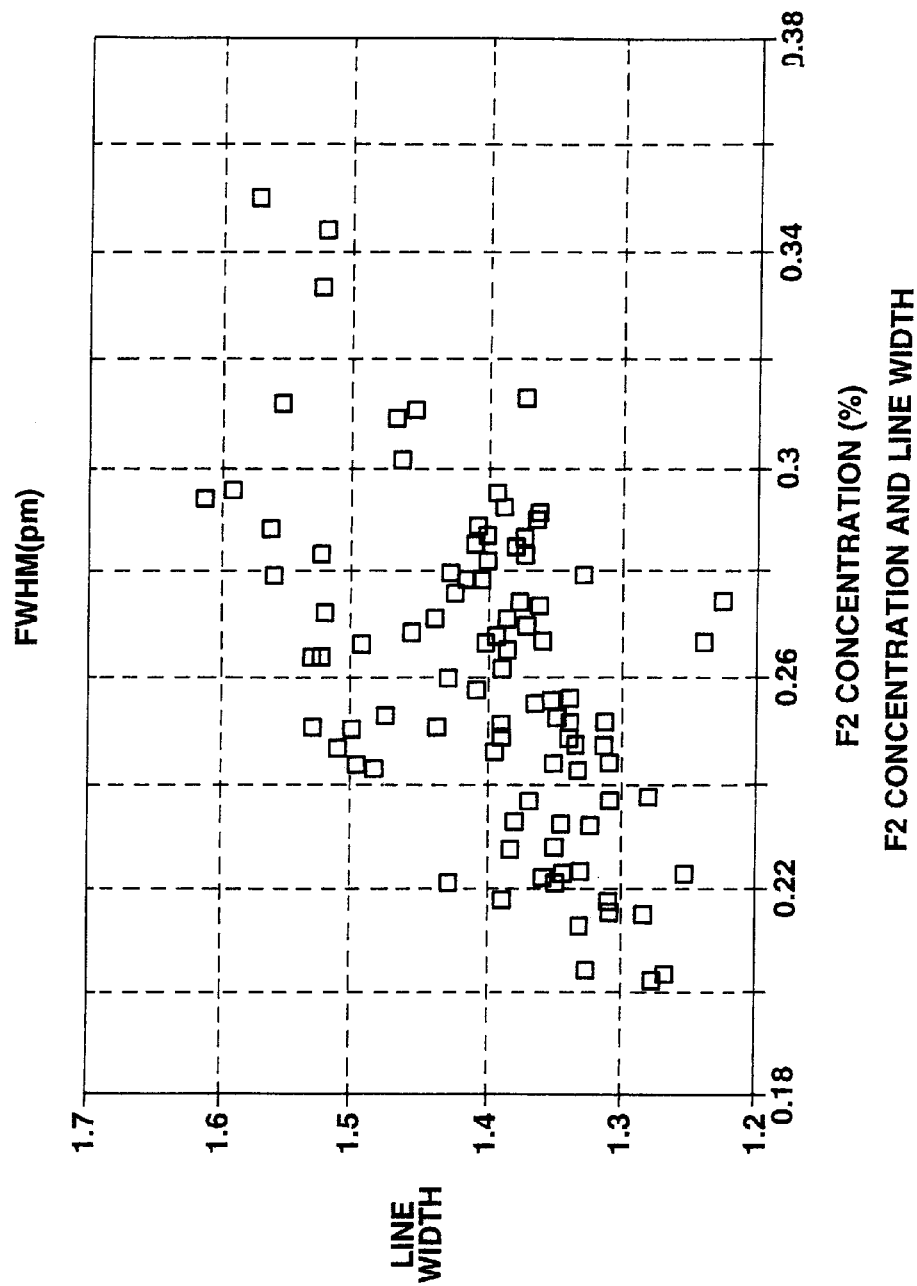
FIG. 22 is a graph showing the experimental results regarding the relationship between F2 concentration and spectral line width.
Figure 23:
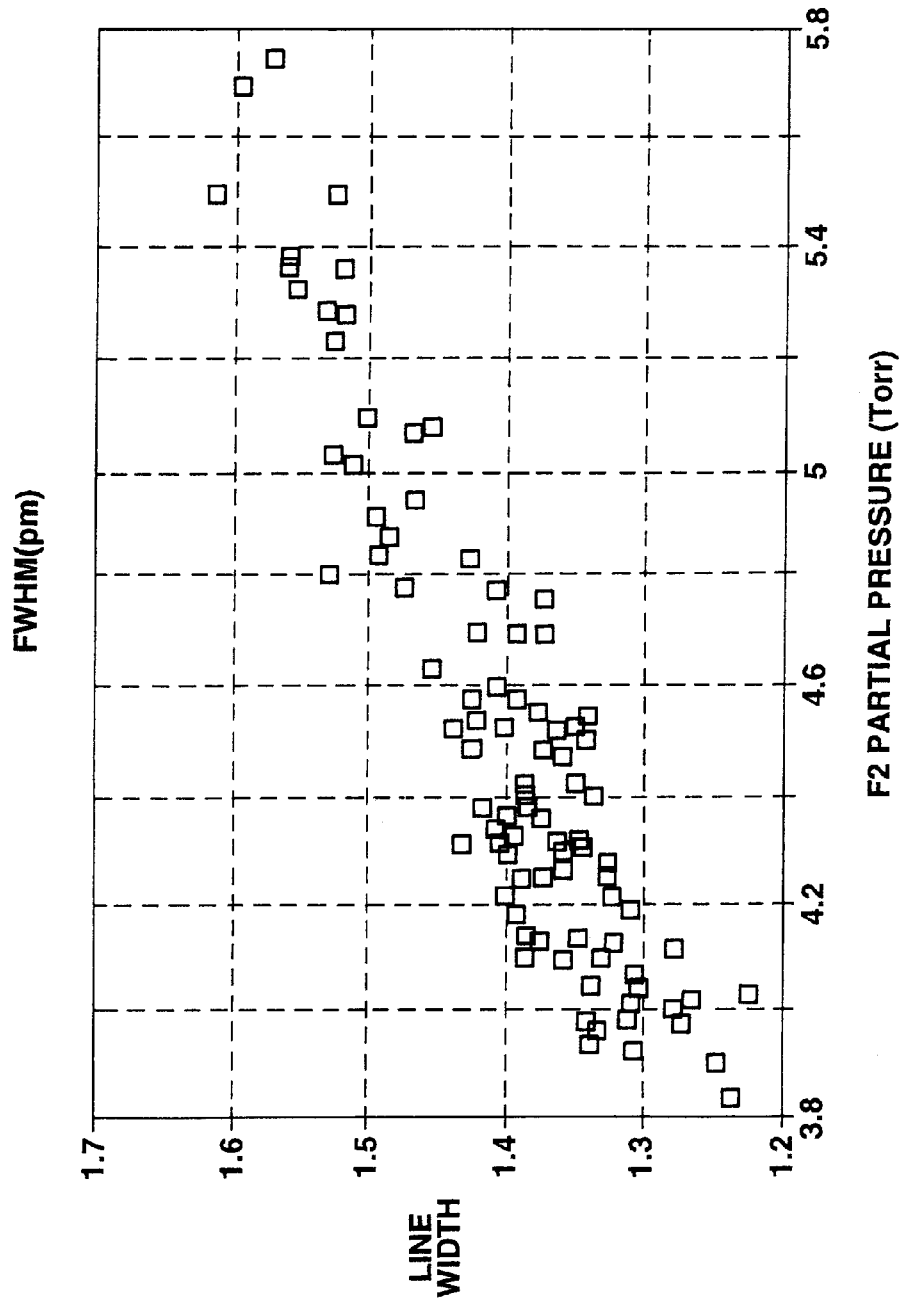
FIG. 23 is a graph showing experimental results regarding the relationship between F2 partial pressure and spectral line width.

FIG. 22 shows experimental results expressing the relationship between F2 concentration and spectral line width; FIG. 23 shows experimental results expressing the relationship between F2 partial pressure and spectral line width. Looking at these graphs, it can be seen that there is no correlation between the F2 concentration and spectral line width shown in FIG. 22, but there is a clear inverse proportional relationship between the F2 partial pressure and spectral line width shown in FIG. 23.

From these experimental results, the present inventors concluded that "line width is proportional to number of F2 molecules (proportional to F2 partial pressure). However, since the percentage concentration in the mixed gas changes with increase or decrease of other gases, this does not reflect accurately the molecules i.e. the spectral line width."

This can also be proved from the state equation of the gas. If now we let the partial pressure of each gas in the mixed gas be Pi (i=~n), the number of molecules of each gas in the mixed gas be Ni (i=~n), the internal volume of the laser chamber be v, the gas constant be R, and the gas temperature t, the following equation is established:

$$\Sigma P_i \cdot v = \Sigma N_i \cdot R \cdot t \quad (1)$$

If now we imagine that the number of molecules is increased to Nj+δn by adding a certain gas, from the above equation (1), the following equation (2) can be obtained:

$$(P1+P2+ \ldots +Pj \ldots +Pi+\delta P) \times v = (N1+N2+ \ldots +Nj \ldots +Ni+\delta N) \times R \times t \quad (2)$$

By subtracting equation (1) from equation (2), the following equation (3) can be obtained:

$$\delta P \times v = \delta N \times R \times t \quad (3)$$

Since v, R and t are all constants, on focusing on the individual gases in the mixed gas, it can be seen that the increase in number of molecules of a gas and increase in partial pressure are proportional, so the amount of increase of oscillation line width produced by supply of gas can be quantitatively predicted.

Figure 24:
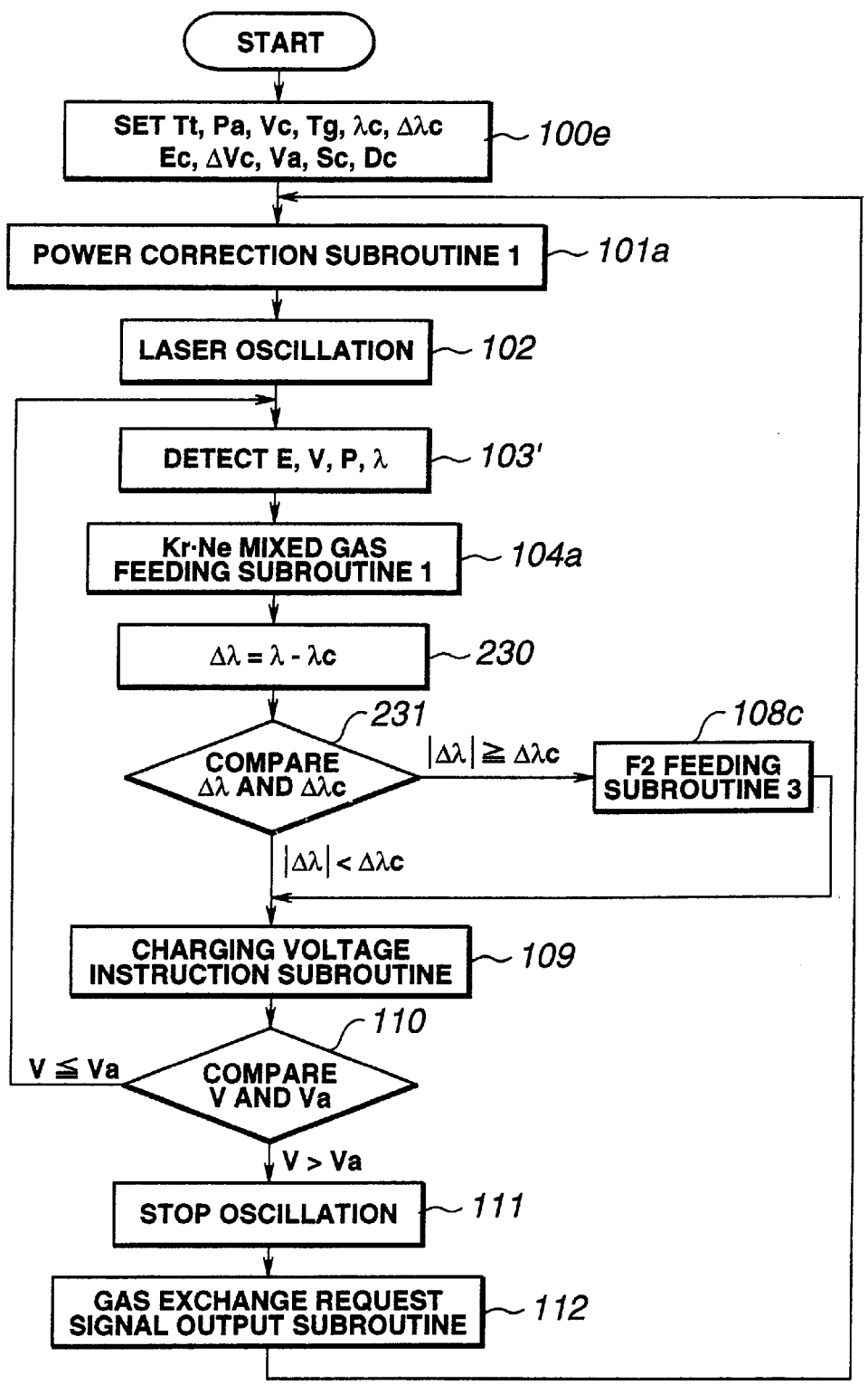
FIG. 24 is a main routine flow chart showing a seventh embodiment of the present invention.

FIG. 24 shows the main routine in this seventh embodiment; in this embodiment, the fluorine feeding processing procedure of the first example (step 105 to step 108a) is substituted by the processing of step 230, step 231, and step 108c. Also, in the initial setting of parameters in step 100e, the target spectral line width λc and the permitted width Δλc of the spectral line width are arranged to be set. Otherwise, this embodiment is exactly the same.

In more detail, when laser oscillation starts (step 102), laser output E, charging voltage V, total pressure P, and spectral line width λ respectively detected by output monitor 11, discharge power source 9, pressure monitor 13, and spectral line width monitor 20 during laser oscillation are input to controller 10 (step 103).

After this, when the Kr/Ne mixed gas feeding subroutine 1 has terminated (step 104), the difference Δλ between the detected spectral line width λ and the target spectral line width λc is calculated (step 230), and this difference Δλ is compared with the permitted width Δλc of the line width (step 231). If, in this comparison, |Δλ|≧Δλc, the procedure advances to the F2 feeding subroutine 3 shown in FIG. 25 (step 108c); if |Δλ|<Δλc, the procedure advances to the next step, and the charging voltage instruction subroutine is executed.

Figure 25:
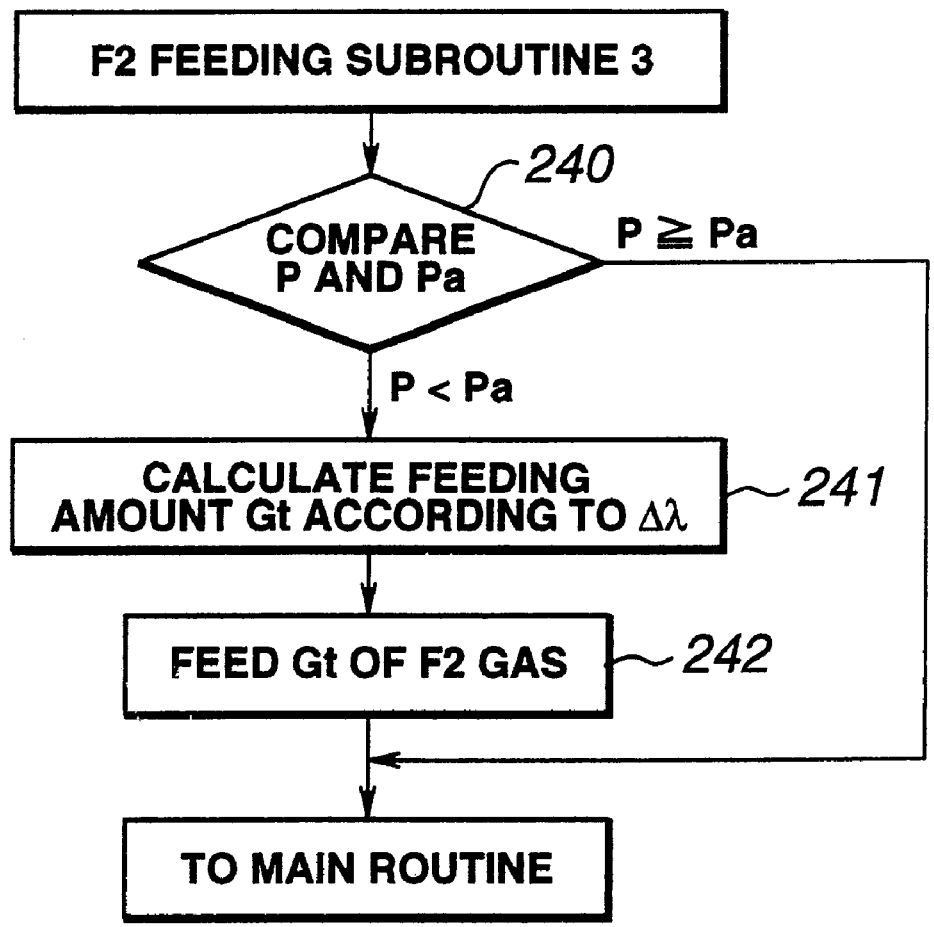
FIG. 25 is a flow chart showing F2 feeding subroutine 3.

In F2 feeding subroutine 3 of FIG. 25, total pressure P is compared with the total pressure Pa after completion of feeding (step 240); if P<Pa, the previously calculated Δλ is used to calculate the F2 gas feeding quantity (step 241), and a quantity of F2 gas equal to this calculated quantity is fed (step 242). In more detail, Δλ and feeding amount Gt are in approximately inverse proportional relationship, so, if line width λ is smaller than the target value, the amount of halogen gas supplied is increased so as to make the spectral line width broader, while, if the spectral line width is broader than the target value, the amount of halogen gas supplied is decreased so as to make the spectral line width narrower.

If, in the comparison of step 240 above, P≧Pa, the procedure returns to the main routine.

The subsequent processing is the same as in the case of the first embodiment above.

Eighth embodiment

An eighth embodiment will now be described with reference to FIG. 26 to FIG. 28.

Figure 26:
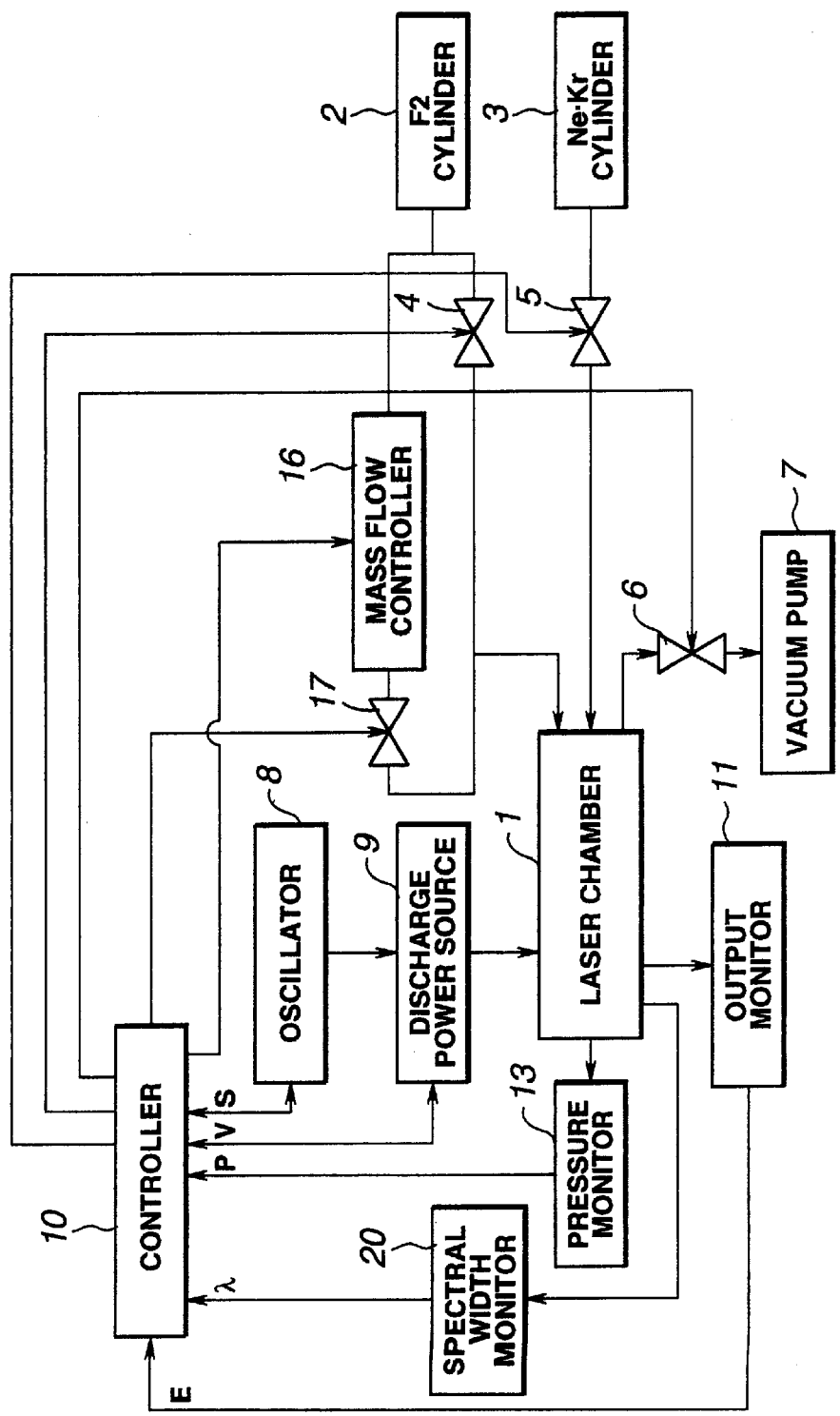
FIG. 26 is a block diagram showing an eighth embodiment of this invention.

In this eighth embodiment, as shown in FIG. 26, just as in the case of the seventh embodiment above, there is provided a spectral line width monitor 20, and a mass flow controller 16 is employed for supplying the F2 gas.

Figure 27:
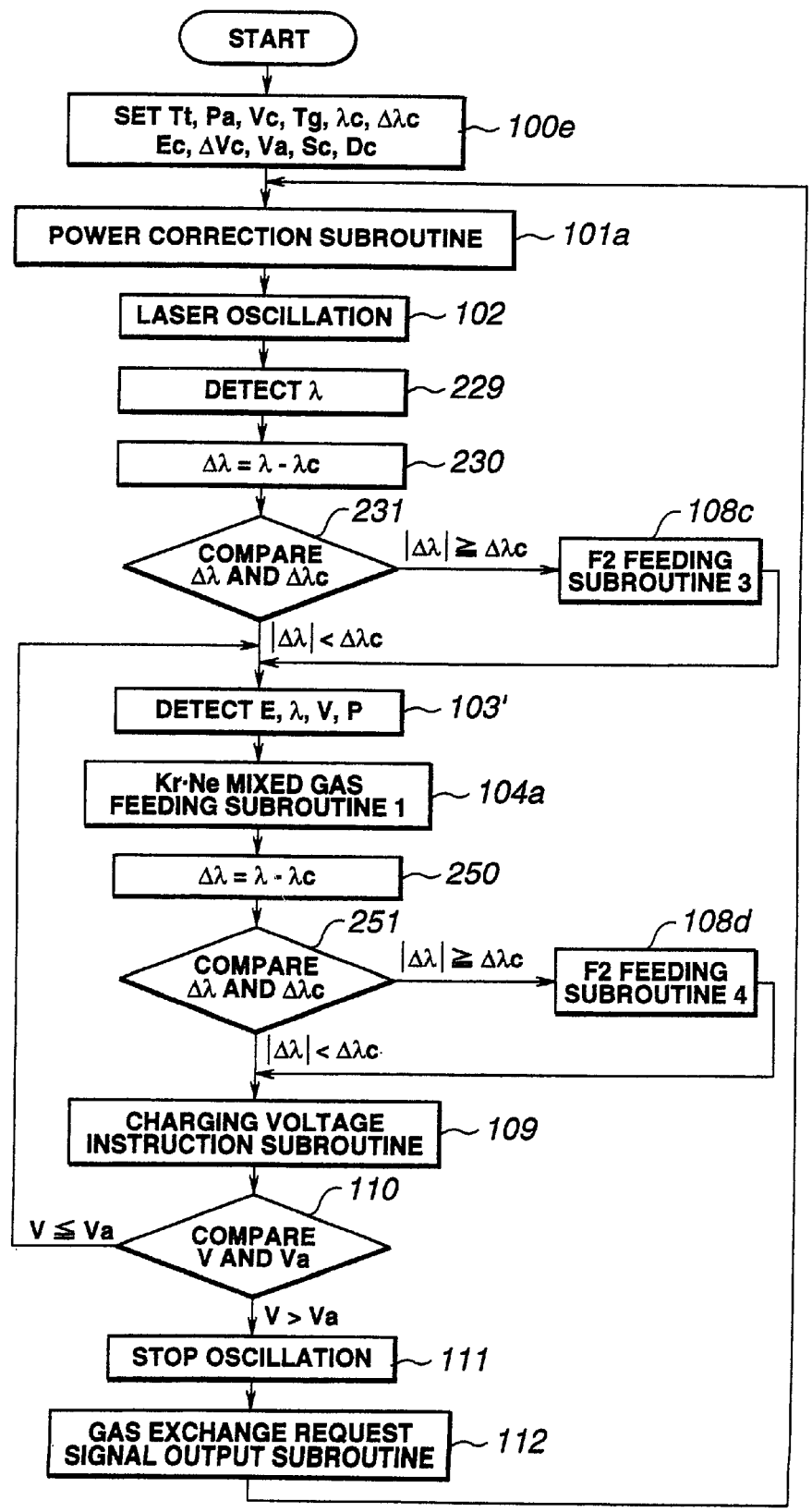
FIG. 27 is a main routine flow chart showing an eighth embodiment of the present invention.

FIG. 27 shows the main routine in this eighth embodiment; in this eighth embodiment, after commencement of laser oscillation (step 102), control of feeding of F2 gas is performed in accordance with a line width comparison and (steps 229 to 231, 108c), after Kr/Ne mixed gas feeding subroutine 1 (step 104a), F2 gas feeding control is again exercised based on a line width comparison. Otherwise, this embodiment is the same as the seventh embodiment.

Specifically, laser oscillation is commenced (step 102); spectral line width $\lambda$ is detected (step 229), the difference $\Delta\lambda$ between this detected spectral line width $\lambda$ and the target spectral line width $\lambda c$ is calculated (step 230); and this difference $\Delta\lambda$ is compared with the permitted width $\Delta\lambda c$ of the line width (step 231). If, in this comparison, $|\Delta\lambda| \geq \Delta\lambda c$, the procedure advances to the F2 feeding subroutine 3 shown in FIG. 25 above (step 108c); if $|\Delta\lambda| < \Delta\lambda c$, the procedure advances to the next step 103.

In the F2 feeding subroutine 3 of FIG. 25, total pressure P is compared with the total pressure Pa after completion of feeding (step 240); if P<Pa, the previously calculated $\Delta\lambda$ is used to calculate the F2 gas feeding quantity (step 241); and an amount of F2 gas equal to this calculated quantity is fed (step 242).

Also, when Kr/Ne mixed gas feeding subroutine 1 has been completed (step 104a), the difference $\Delta\lambda$ between the detected spectral line width $\lambda$ and the target spectral line width $\lambda c$ is again calculated (step 250), and this difference $\Delta\lambda$ is compared with the permitted width $\Delta\lambda c$ of the line width (step 251). If, in this comparison, $|\Delta\lambda| \geq \Delta\lambda c$, the procedure advances to the F2 feeding subroutine 4 shown in FIG. 28 (step 108d); if $|\Delta\lambda| < \Delta\lambda c$, the procedure advances to the next step and the charging voltage instruction subroutine is executed (step 109).

Figure 28:
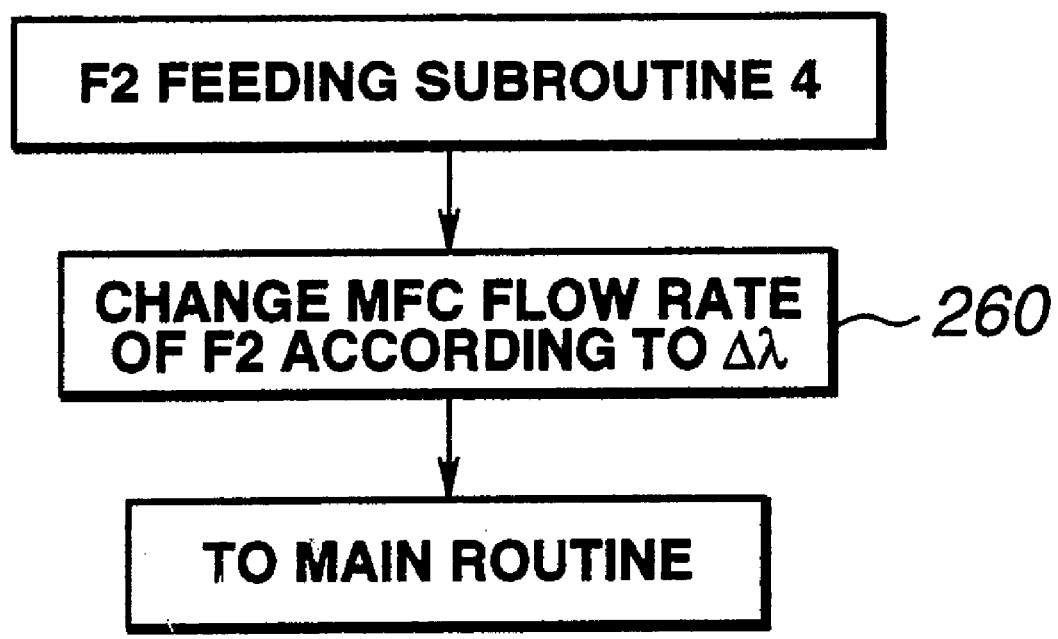
FIG. 28 is a flow chart showing F2 feeding subroutine 4.
Figure 29:
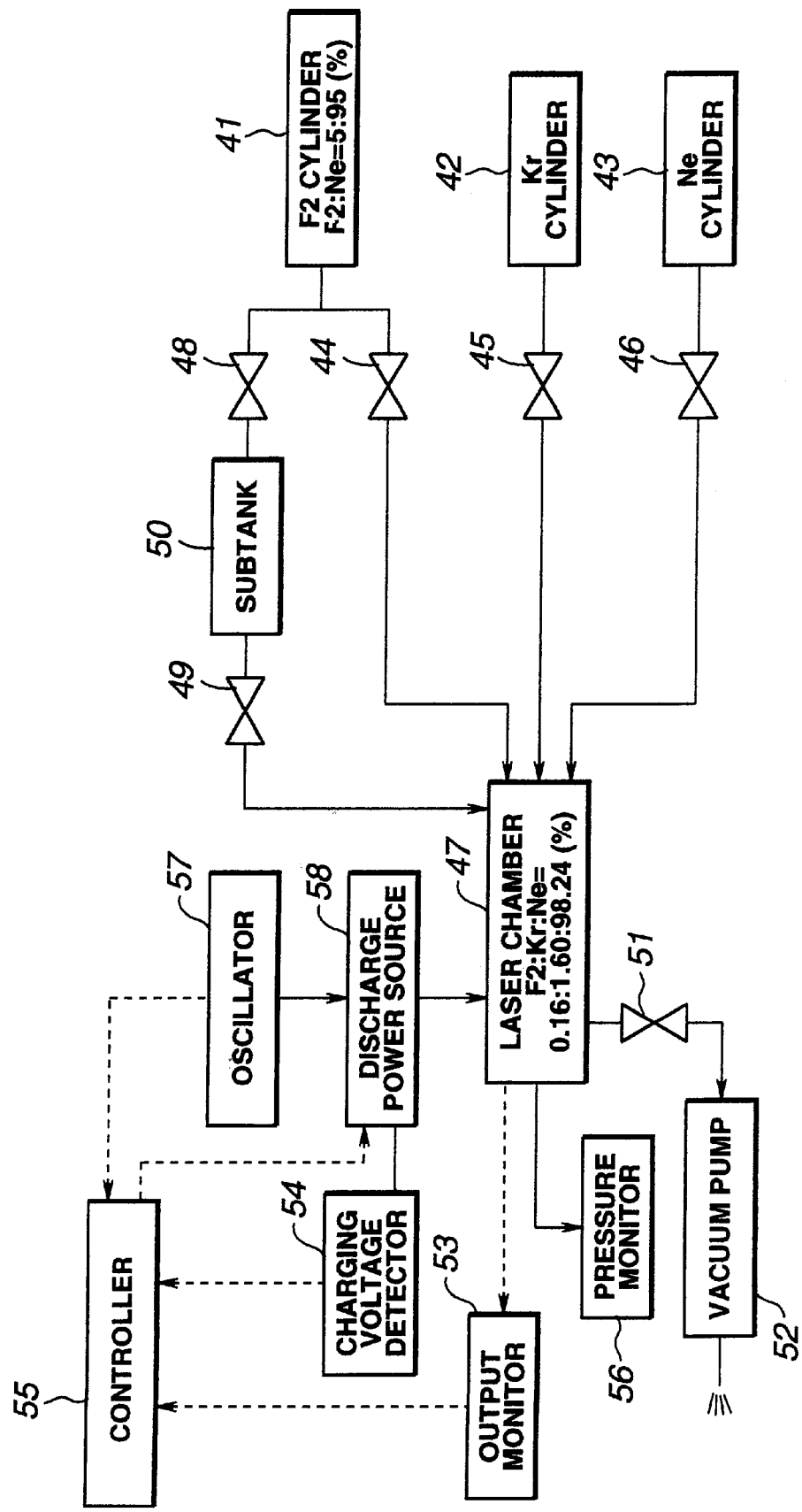
FIG. 29 is a view showing a prior art gas supplementation control layout.
Figure 30:
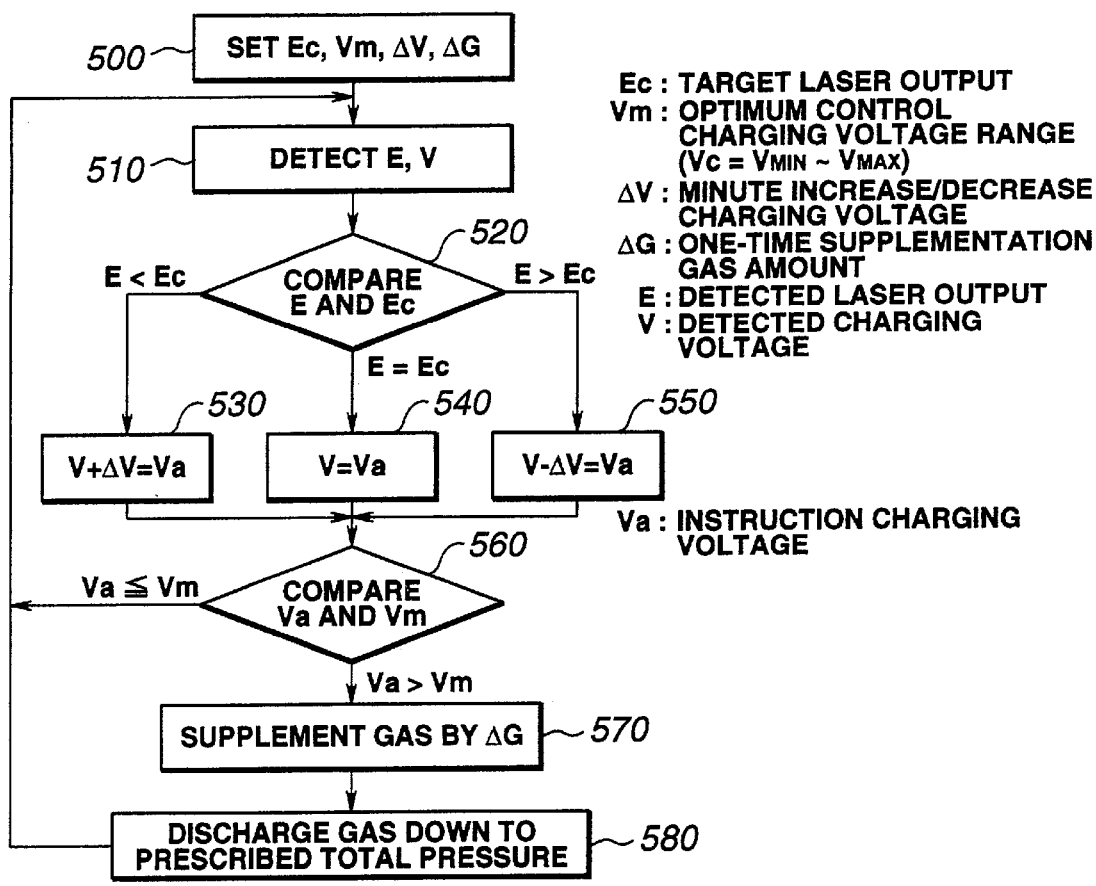
FIG. 30 is a flow chart showing prior art gas supplementation control.
Figure 31A:
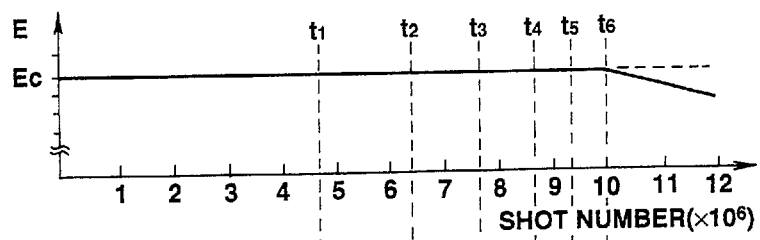
FIGS. 31(a) to 31(d) are graphs showing the amounts of various conditions produced in the prior art gas supplementation control.
Figure 31B:
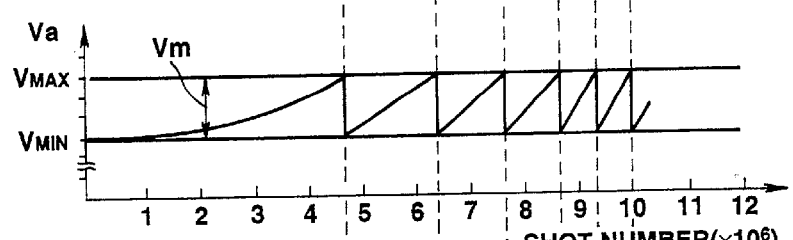
Figure 31C:
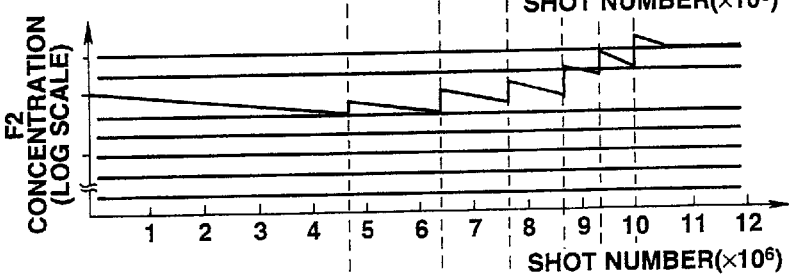
Figure 31D:
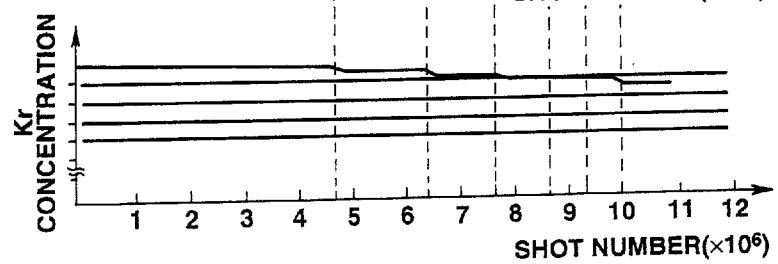

In F2 feeding subroutine 4 of FIG. 28, the F2 gas flow amount passing through mass flow controller 16 is altered in accordance with $\Delta\lambda$ (step 260).

It should be noted that, although, in the embodiment described above, on/off valve 17 was always open, it would be possible to arrange to have the flow amount of the mass controller 16 fixed and to effect on/off control of on/off valve 17 in response to $\Delta\lambda$.

Also, in the present invention, He or Ne and He mixed gas can be used as buffer gas, HCl can be used as halogen gas, and Xe or Ar can be used as rare gas.

Also, although, in the embodiments, the Kr/Ne mixed gas was stored in a single cylinder, these could be stored in separate cylinders and control performed such that the prescribed mixing ratio is achieved within the laser chamber.

Furthermore, although, in the main routines illustrated in FIG. 2, FIG. 8, FIG. 11, FIG. 14, FIG. 17, FIG. 20, FIG. 24 and FIG. 27, V and Va were compared and oscillation was stopped if V>Va, in the case of the exposure period, the laser could be allowed to continue oscillation, the procedure shifting to the gas exchange request signal output subroutine on input of oscillation stoppage permission.

INDUSTRIAL APPLICABILITY

The present invention can be utilized in an excimer laser apparatus employed in a light source for size-reduction projection exposure, microprocessing of materials, and surface improvement of materials etc.

What is claimed is:

1. A method of gas supplementation of an excimer laser apparatus wherein laser oscillation is performed with feeding of halogen gas, rare gas, and buffer gas into a laser chamber, characterized in that:

before laser oscillation, an oscillation stop time is calculated, and, if the calculated oscillation stop time exceeds a prescribed time, the calculated oscillation stop time is used to calculate a feeding amount of mixed gas comprising rare gas and buffer gas, and the mixed gas is fed, prior to laser oscillation, in the calculated feeding amount.

2. A method of gas supplementation of an excimer laser apparatus according to claim 1, wherein a predictive calculation is made of a total pressure after feeding of the mixed gas, and, only if the calculated total pressure does not satisfy a prescribed value, the mixed gas in the calculated feeding amount is fed.

3. A method of gas supplementation of an excimer laser apparatus wherein laser oscillation is performed with feeding of halogen gas, rare gas and buffer gas into a laser chamber, characterized in that:

during laser operation, a halogen gas partial pressure in the laser chamber is detected, and a halogen gas supplementation amount is determined corresponding to the detected partial pressure value.

4. A method of gas supplementation of an excimer laser apparatus according to claim 3, characterized in that:

a difference is found between the detected partial pressure value of the halogen gas and a target halogen gas partial pressure, and a supplementary amount of halogen gas that is supplied is determined in accordance with the difference.

5. A method of gas supplementation of an excimer laser apparatus according to claim 4, characterized in that:

supplementation of the halogen gas is performed when the difference exceeds a prescribed allowable width and a total pressure within the laser chamber does not satisfy the prescribed value.

6. A method of gas supplementation of an excimer laser apparatus wherein laser oscillation is performed with feeding of halogen gas, rare gas and buffer gas into a laser chamber, characterized in that:

prior to laser oscillation, feeding of mixed gas comprising rare gas and buffer gas is not performed, a laser output is detected immediately after laser oscillation, and if the detected laser output exceeds a predetermined rated laser output, a charging voltage is detected and the mixed gas comprising rare gas and buffer gas is fed in the amount calculated corresponding to the detected charging voltage.

7. A gas supplementation method of excimer laser apparatus in which laser oscillation is performed with feeding of halogen gas, rare gas and buffer gas into a laser chamber, wherein:

prior to laser oscillation, if a gas exchange request signal is output, an initial power lock voltage in a presently charged gas is detected and the detected value is compared with a prescribed threshold value and, if the detected value is smaller than the threshold value, gas exchange is effected with a gas composition the same as on a previous occasion; but, if the detected value is larger than the threshold value, the fed amount of mixed gas comprising rare gas and buffer gas is altered in accordance with a deviation between the detected value and the threshold value, and gas exchange is performed with a gas composition based on the altered feeding amount.

8. A method of gas supplementation of an excimer laser apparatus according to claim 7, wherein:

the gas exchange request signal is output if a charging voltage exceeds an upper limit value of the charging voltage.

9. A gas supplementation method of an excimer laser apparatus, in which laser oscillation is performed with feeding of halogen gas and rare gas, and buffer gas into a laser chamber and a mixed gas comprising rare gas and buffer gas is fed in a prescribed amount if a charging voltage exceeds a prescribed threshold value during laser oscillation, characterized in that:

if the charging voltage exceeds the prescribed threshold value during laser oscillation, after mixed gas comprising rare gas and buffer gas was fed on the previous occasion, a time interval for which oscillation occurred with the charging voltage in excess of the threshold value is measured and at a time point where the time interval exceeds a prescribed time, the mixed gas is fed in the prescribed amount.

10. A method of gas supplementation of an excimer laser apparatus according to claim 9 wherein feeding of the mixed gas is performed if a total gas pressure in the laser chamber does not satisfy a prescribed threshold value gas pressure.

11. A gas supplementation method of an excimer laser apparatus in which laser oscillation is performed with feeding of halogen gas, rare gas and buffer gas into a laser chamber, characterized in that:

if a gas exchange request signal is output prior to laser oscillation, a window exchange signal or a maintenance request signal is output in response to an oscillation shot number of a presently charged gas, a period of charging of the presently charged gas, a gas pressure within the laser chamber, or the number of times of gas charging after window exchange of the laser chamber.

12. A method of gas supplementation of an excimer laser apparatus according to claim 11, wherein the gas exchange request signal is output when a charging voltage exceeds un upper limit value of the charging voltage.

13. In an excimer laser apparatus in which laser oscillation is performed with feeding of halogen gas, rare gas, or buffer gas into a laser chamber, characterized in that a gas supplying device comprises:

quantity flow rate controller for supplying to the laser chamber a mixed gas comprising rare gas and buffer gas supplied from a gas bomb;

charging voltage detecting means for detecting a charging voltage after laser oscillation; and control means for determining a difference between the detected charging voltage and an upper limit of the charging voltage and changing a supply flow rate of the quality flow rate controller in accordance with the determined differences.

14. An excimer laser apparatus according to claim 13, wherein feeding of mixed gas is performed when the difference exceeds a prescribed allowable width.

15. A method of gas supplementation of an excimer laser apparatus in which laser pulse oscillation is performed at a predetermined repetitive frequency with feeding of halogen gas, rare gas and buffer gas into a laser chamber, characterized in that:

a laser shot number from the feeding of mixed gas comprising rare gas and buffer gas on a previous occasion is calculated and feeding of the mixed gas is performed if the shot number exceeds a prescribed threshold value.

16. A method of gas supplementation of an excimer laser apparatus in which laser oscillation is performed with feeding of halogen gas, rare gas and buffer gas into a laser chamber, characterized in that:

an oscillation spectral line width is detected and an amount of halogen gas feeding is determined in accordance with a difference between the detected line width value and a target spectral line width.

17. A method of gas supplementation of an excimer laser apparatus according to claim 16, wherein:

the feeding of the halogen gas is performed if a total gas pressure within the laser chamber does not satisfy a prescribed threshold value gas pressure.

* * * * *